United States Patent
Cai et al.

(10) Patent No.: US 11,837,960 B2
(45) Date of Patent: Dec. 5, 2023

(54) PHASE SHIFT ERROR MITIGATION FOR POWER CONVERTERS WITH COUPLED INDUCTORS

(71) Applicant: Apple Inc., Cupertino, CA (US)

(72) Inventors: Chongli Cai, San Jose, CA (US); Hao Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 17/483,515

(22) Filed: Sep. 23, 2021

(65) Prior Publication Data

US 2023/0092655 A1    Mar. 23, 2023

(51) Int. Cl.
*H02M 3/158* (2006.01)
*H02M 1/084* (2006.01)
*H02M 1/00* (2006.01)

(52) U.S. Cl.
CPC ....... *H02M 3/1586* (2021.05); *H02M 1/0003* (2021.05); *H02M 1/084* (2013.01); *H02M 3/1584* (2013.01)

(58) Field of Classification Search
CPC . H02M 3/1586; H02M 1/0003; H02M 1/0032
See application file for complete search history.

(56) References Cited

U.S. PATENT DOCUMENTS

| | | | |
|---|---|---|---|
| 9,500,678 B2 | 11/2016 | Williams | |
| 10,707,761 B1* | 7/2020 | Couleur | H02M 3/1582 |
| 2018/0083532 A1* | 3/2018 | Gozzini | H02M 3/1584 |
| 2018/0083534 A1* | 3/2018 | Pant | H02M 3/158 |
| 2019/0190279 A1* | 6/2019 | Xu | H02M 3/1584 |
| 2020/0313445 A1 | 10/2020 | Slepchenkov et al. | |
| 2023/0047637 A1* | 2/2023 | Kwon | H02M 3/1586 |

* cited by examiner

*Primary Examiner* — Alex Torres-Rivera
(74) *Attorney, Agent, or Firm* — Kowert, Hood, Munyon, Rankin & Goetzel, P.C.; Dean M. Munyon

(57) ABSTRACT

A power converter circuit that includes multiple phase circuits may employ coupled inductors to generate a particular voltage level on a regulated power supply node. In response to an initiation of an active time period, the phase circuits cycle, out of phase with each other, between on-times and off-times. To maintain the phase relationship between the operation of the phase circuits, each phase circuit generates a ramp current that is compared to the current flowing in its corresponding inductor and then halts an off-time based on a result of the comparison.

20 Claims, 15 Drawing Sheets

PHASE SHIFT ERROR MITIGATION FOR POWER CONVERTERS WITH COUPLED INDUCTORS

BACKGROUND

Technical Field

Embodiments described herein relate to integrated circuits, and more particularly, to techniques for generating regulated power supply voltages.

Description of the Related Art

Modern computer systems include multiple circuits blocks designed to perform various functions. For example, such circuit blocks may include processors, or processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments of a power converter circuit configured to generate a regulated power supply voltage level are disclosed. Broadly speaking, a control circuit is configured to initiate an active period for first and second phase circuits. The first phase circuit includes a first switch node coupled to a regulated power supply node via a first coil of a pair of coupled inductors, and the second phase circuit includes a second switch node coupled to the regulated power supply node via a second coil of the pair of coupled inductors. In response to the initiation of the active period, the first phase circuit is configured to cycle between a first set of on-time and off-time periods, and halt a particular off-time period of the first set based on a comparison of a first current flowing in the first coil, a first ramp current, and a first threshold current. In response to the initiation of the active period, the second phase circuit is configured to cycle, out of phase with the first phase circuit, between a second set of on-time and off-time periods, and halt a particular off-time period of the second set based on a comparison of a second current flowing in the second coil, a second ramp circuit, and a second threshold current.

BRIEF DESCRIPTION OF THE DRAWINGS

The following detailed description makes reference to the accompanying drawings, which are now briefly described.

DETAILED DESCRIPTION OF EMBODIMENTS

Figure 1:
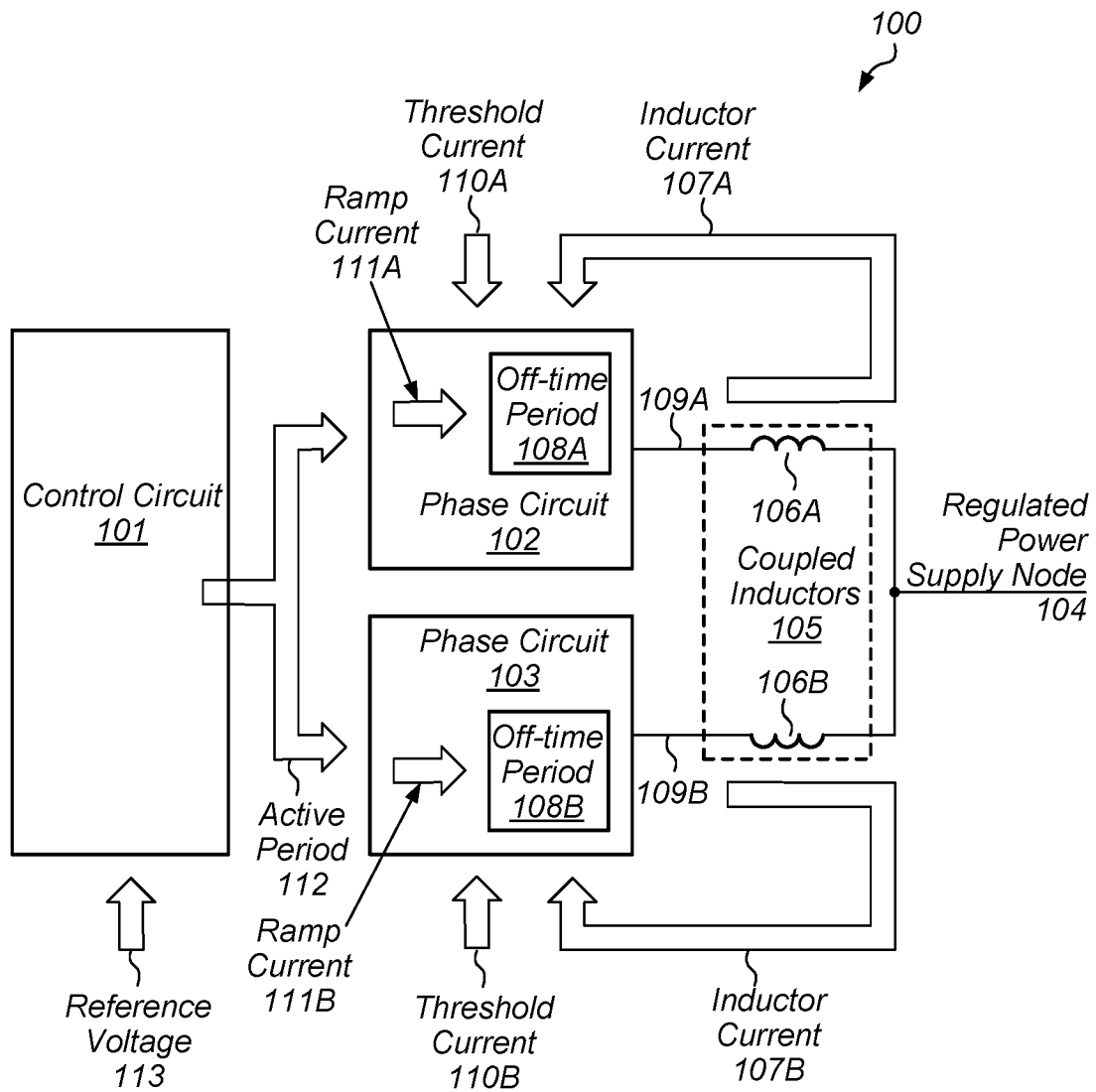
FIG. 1 is a block diagram of an embodiment of a power converter circuit.

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ a regulator circuit that includes both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include two switches (also referred to as "power switches") and a switch node that is coupled to a regulated power supply node via an inductor. One switch is coupled between an input power supply node and the switch node, and is referred to as the "high-side switch." Another switch is coupled between the switch node and a ground supply node, and is referred to as the "low-side switch."

When the high-side switch is closed, energy is applied to the inductor, allowing the current through the inductor to increase. Such a time period may be referred to as an "on-time period" or a "charge period." During one of these time periods, the inductor stores energy in the form of a magnetic field. When the high-side switch is opened and the low-side switch is closed, energy is no longer being applied to the inductor and the voltage across the inductor reverses. During these periods, which may be referred to as "off-time periods", the inductor functions as a current source, with the energy stored in the inductor's magnetic field supporting the current flowing into the load. The process of closing and opening the high-side and low-side switches is performed periodically to maintain a desired voltage level on the power supply node. One on-time followed by an associated off-time forms a "charge cycle."

The power switches included in buck converters may be operated in different modes. In some cases, a buck converter may employ pulse width modulation (PWM), in which the frequency with which the buck converter cycles is fixed, but the period of time that the high-side switch is closed is adjusted based on a comparison of an output voltage of the buck converter to a reference voltage. In other cases, a buck converter may employ pulse frequency modulation (PFM), in which the frequency with which the buck converter cycles (including on-time, off-time, and idle time) is adjusted based on the load current.

Some buck converters may employ multiple inductors driven by respective phase circuits (also referred to as "phase units"). The phase circuits are operated out of phase with each other to better manage power delivered to a load. In order to reduce the area needed for multiple inductors, coupled inductors may be used. As used and described herein, "coupled inductors" refer to two or more inductors that share a common magnetic core. The use of a common magnetic core allows some degree of mutual inductance between the pair of inductors.

In multi-phase power converters that employ coupled inductors, there may be a loss of energy in the common magnetic core resulting from current ripple in the coils, as well as a loss of efficiency in situations in which a load circuit does not require a large amount of current. Moreover, the average current delivered by the different phase currents may not be equal, further degrading the efficiency of the multi-phase power converter. By controlling the phase relationship between the currents flowing in the coupled inductors, the average current by the different phase circuits may be made equal, and losses in the common magnetic core may be reduced by minimizing current ripple, thereby improving the efficiency of the power converter.

In some power converters, at the start of an active period, an initial phase relationship between the currents flowing in respective coils of a coupled inductor is introduced. As operation continues, however, the initial phase relationship begins to decrease and the currents in the coils of the coupled inductor become more in phase with each other, increasing energy loss and decreasing efficiency. The embodiments illustrated in the drawings and described below provide techniques for operating a power converter circuit to maintain a particular phase relationship between respective currents flowing in coupled inductors in a multi-phase power converter by starting with an initial phase difference that is reinforced during subsequent cycles within an active period of the power converter circuit. These embodiments may serve to reduce energy loss, improve efficiency, and allow the phase circuits to deliver similar average currents to a load.

A block diagram depicting an embodiment of a power converter circuit is illustrated in FIG. 1. As illustrated, power converter circuit 100 includes control circuit 101, phase circuit 102, phase circuit 103, and coupled inductors 105.

Control circuit 101 is configured to initiate, based on a voltage level of regulated power supply node 104 and reference voltage 113, active period 112 for the phase circuits 102 and 103. In various embodiments, control circuit 101 is configured to operate phase circuits 102 and 103 in PFM mode. In various embodiments, control circuit 101 is configured to perform a comparison of a voltage level of regulated power supply node 104 to a reference voltage level, and initiate active period 112 using results of the comparison. Control circuit 101 may, in some embodiments, be configured to halt active period 112, in response to a determination that respective numbers of the first set of on-time and off-time periods, and the second set of on-time and off-time periods have completed.

Phase circuit 102 is coupled to switch node 109A, which is, in turn, coupled to regulated power supply node 104 via coil 106A included in coupled inductors 105. In response to an initiation of active period 112, phase circuit 102 is configured to cycle between a first set of on-time and off-time periods, and halt off-time period 108A based on a comparison of inductor current 107A, ramp current 111A, and threshold current 110A.

Phase circuit 103 is coupled to switch node 109B, which is, in turn, coupled to regulated power supply node 104 via coil 106B included in coupled inductors 105. In response to the initiation of active period 112, phase circuit 103 is configured to cycle, out of phase with phase circuit 102, between a second set of on-time and off-time periods, and halt off-time period 108B based on a comparison of inductor current 107B, ramp current 111B, and threshold current 110B.

As described below, phase circuit 102 and phase circuit 103 may include respective timer circuits. Phase circuit 102 may be further configured to start its timer circuit in response to an initiation of a particular on-time period that occurs prior to the particular off-time period, and phase circuit 103 may be further configured to start its timer circuit in response to the initiation of a given on-time period that occurs prior to the particular off-time period.

In various embodiments, phase circuit 102 may be further configured to initiate ramp current 111A, in response to a determination that a value of its timer circuit has reached a first threshold value. Phase circuit 103 may be further configured to initiate ramp current 111B, in response to a determination that a value of its timer circuit has reached a second threshold value. In some embodiments, phase circuit 102 may be further configured to halt ramp current 111A, in response to a determination that off-time period 108A has ended, and phase circuit 103 may be further configured to halt ramp current 111B, in response to a determination that off-time period 108B has ended.

In various embodiments, phase circuit 102 is further configured to cycle between the first set of on-time and off-time periods after a starting on-time period has elapsed since the initiation of active period 112, and phase circuit 103 is further configured to cycle between the second set of on-time and off-time periods after the starting on-time period has elapsed. In some cases, a duration of an initial on-time period in the second set of on-time and off-time periods is less than a duration of a subsequent on-time period in the second set of on-time and off-time periods.

It is noted that although only two phase circuits are depicted as being coupled to regulated power supply node 104 via coupled inductors 105, in other embodiments, additional pairs of phase circuits may be coupled to regulated power supply node 104 via corresponding coupled inductors.

Phase circuits, such as phase circuits 102 and 103 may operate in a variety of fashions. For example, for a fixed set of values of the voltage level of regulated power supply node 104 and a voltage level of an input power supply, the duration of an on-time period is fixed, while the duration of the an off-time period is based on a comparison of a current flowing in an inductor to a threshold value. This type of operation is commonly referred to as "valley control." Alternatively, for a fixed set of values of the voltage level of regulated power supply node 104 and a voltage level of an input power supply, the duration of the off-time may be fixed, while the duration of the on-time period is based on a comparison of the inductor current to a threshold value.

Figure 2:
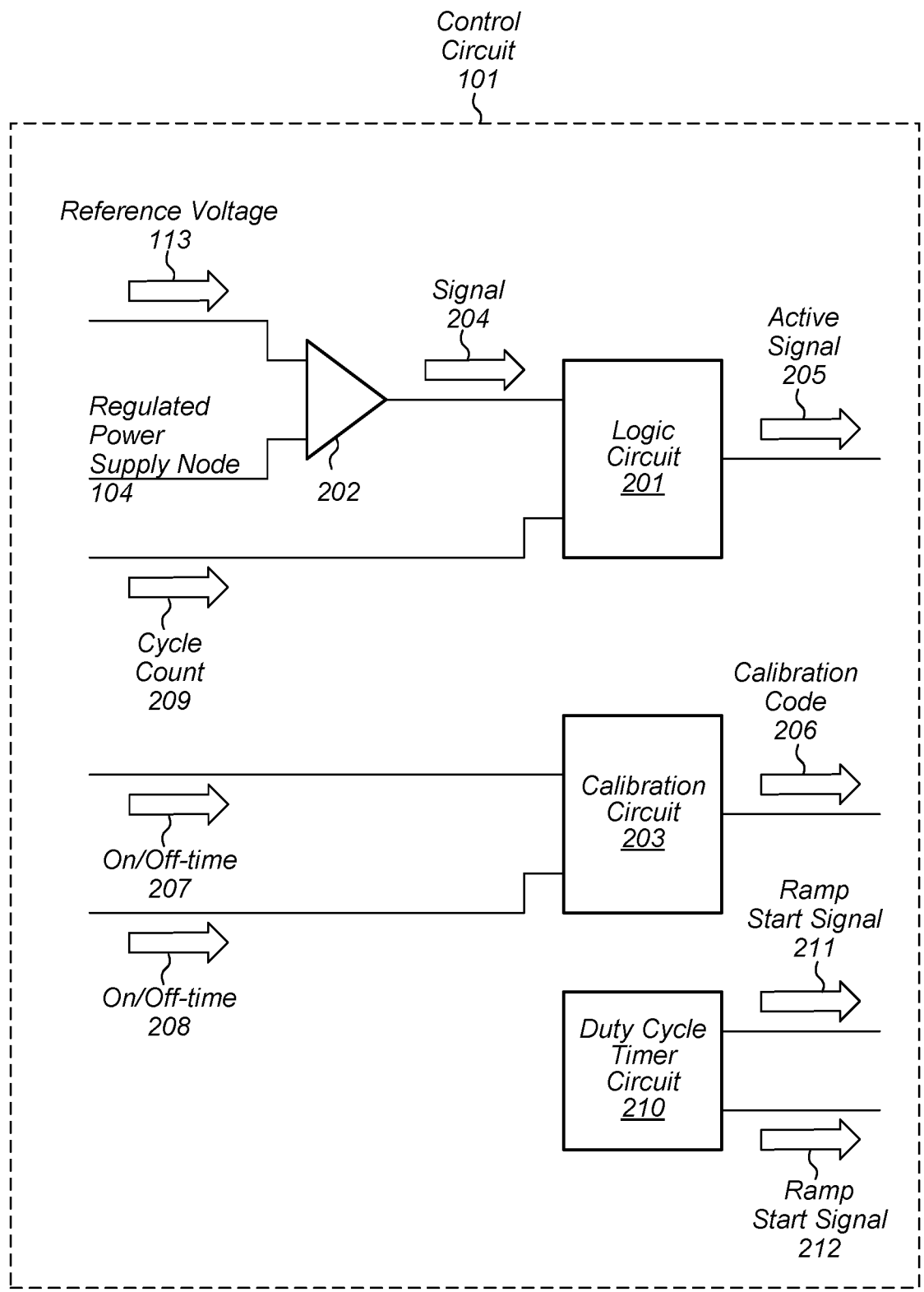
FIG. 2 is a block diagram of an embodiment of a control circuit for a power converter circuit.

A block diagram of an embodiment of control circuit 101 is depicted in FIG. 2. As illustrated, control circuit 101 includes logic circuit 201, comparator 202, and calibration circuit 203.

Comparator 202 is configured to generate signal 204 based on a comparison of reference voltage 113 and a voltage level of regulated power supply node 104. For example, comparator 202 may activate signal 204 in response to a determination that the voltage level of regulated power supply node 104 is less than reference voltage 113. Comparator 202 may, in various embodiments, be an embodiment of a differential amplifier or any other circuit suitable for comparing two voltage levels.

Logic circuit 201 may be an embodiment of a microcontroller or state machine configured to generate active signal 205 using signal 204 and cycle count 209. In some embodiments, logic circuit 201 may activate active signal 205 in response to an activation of signal 204. Logic circuit 201 may also be configured to deactivate active signal 205 in response to cycle count 209 reaching a threshold value. In various embodiments, cycle count 209 may correspond to a number of on-time (or off-time) periods that phase circuits 102 and 103 complete upon being activated, and the threshold value may be programmable. It is noted that, if signal 204 is still active when cycle count 209 reaches the threshold value, or there is a transition to PWM mode, logic circuit 201 may be configured to re-activate active signal 205 without any inactive period.

As used herein, when a signal is activated, it is set to a logic or voltage level that activates a load circuit or device. The logic level may be either a high logic level or a low logic level depending on the load circuit. For example, an active state of a signal coupled to a p-channel MOSFET is a low logic level (referred to as an "active low signal"), while an active state of a signal coupled to an n-channel MOSFET is a high logic level (referred to as an "active high signal").

In cases where an adaptive off-time peak current control mode or an adaptive on-time valley current control mode is employed, an additional calibration operation may be used to produce a desired 180-degree phase shift between the currents flowing in coils 106A-B. Calibration circuit 203 is configured to generate calibration code 206 using on/off-time 207 and on/off-time 208. In the case of an on-time valley-current control mode, on/off-time 207 may correspond to a duration of a first full off-time of phase circuit 102 after an initial on-time, while on/off-time 208 may correspond to a duration of a first full off-time of phase circuit 103 after an initial on-time. In the case of an off-time peak current control mode, on/off-time 207 may correspond to a duration of a first full on-time of phase circuit 102 after an initial off-time, while on/off-time 208 may correspond to a duration of a first full on-time of phase circuit 103 after an initial off-time. As described below in more detail, calibration circuit 203 is configured to sample on-time 207 and on-time 208, and compare the results to generate calibration code 206, which may be used to adjust the peak current threshold value (such as the value of peak threshold current 612 of FIG. 6). It is noted that by employing off-time signals instead of on-time signals, calibration circuit 203 may be used in situations where an adaptive on-time valley current control mode is being employed.

Duty-cycle timer circuit 210 is configured to generate ramp start signal 211 and ramp start signal 212. In various embodiments, ramp start signal 211 may be used by phase circuit 102 to adjust the duration of one or more of charge cycles, and ramp start signal 212 may be used by phase circuit 103 to adjust the duration of one or more of charge cycles. As described below in more detail, duty-cycle timer circuit 210 may use multiple currents to charge corresponding capacitors. When the voltages across the capacitors reach a threshold value, duty-cycle timer circuit 210 activates ramp start signal 211 and ramp start signal 212. In various embodiments, the values of the currents and the capacitors may be adjusted to vary the delays from the time of the start of active period 112 to the activation of ramp start signals 211 and 212.

Figure 3:
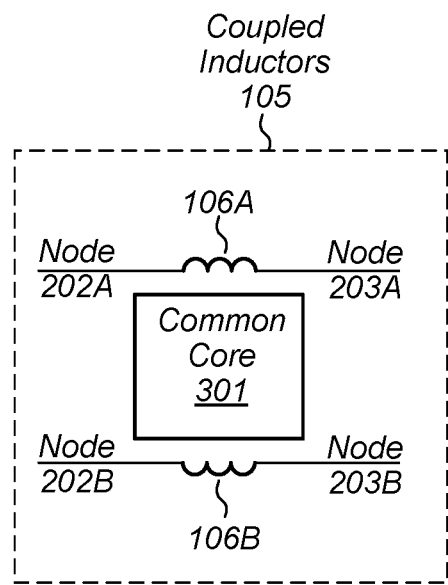
FIG. 3 is a block diagram of an embodiment of coupled inductors.

Turning to FIG. 3, a block diagram of coupled inductors 105 is depicted. As illustrated, coupled inductors 105 includes coils 106A and 106B, and common core 301. In various embodiments, common core 301 may be a ferrous or other magnetic material. In some cases, coupled inductors 105 may be fabricated on a common integrated circuit as control circuit 101 and phase circuits 102 and 103. Alternatively, control circuit 101, phase circuit 102, and phase circuit 103 may be located on one integrated circuit, and coupled inductors 105 may be located on another integrated circuit. It is noted that although only one pair, i.e., two coils, are depicted in coupled inductors 105, in other embodiments, multiple pairs of coils may be employed.

Figure 4:
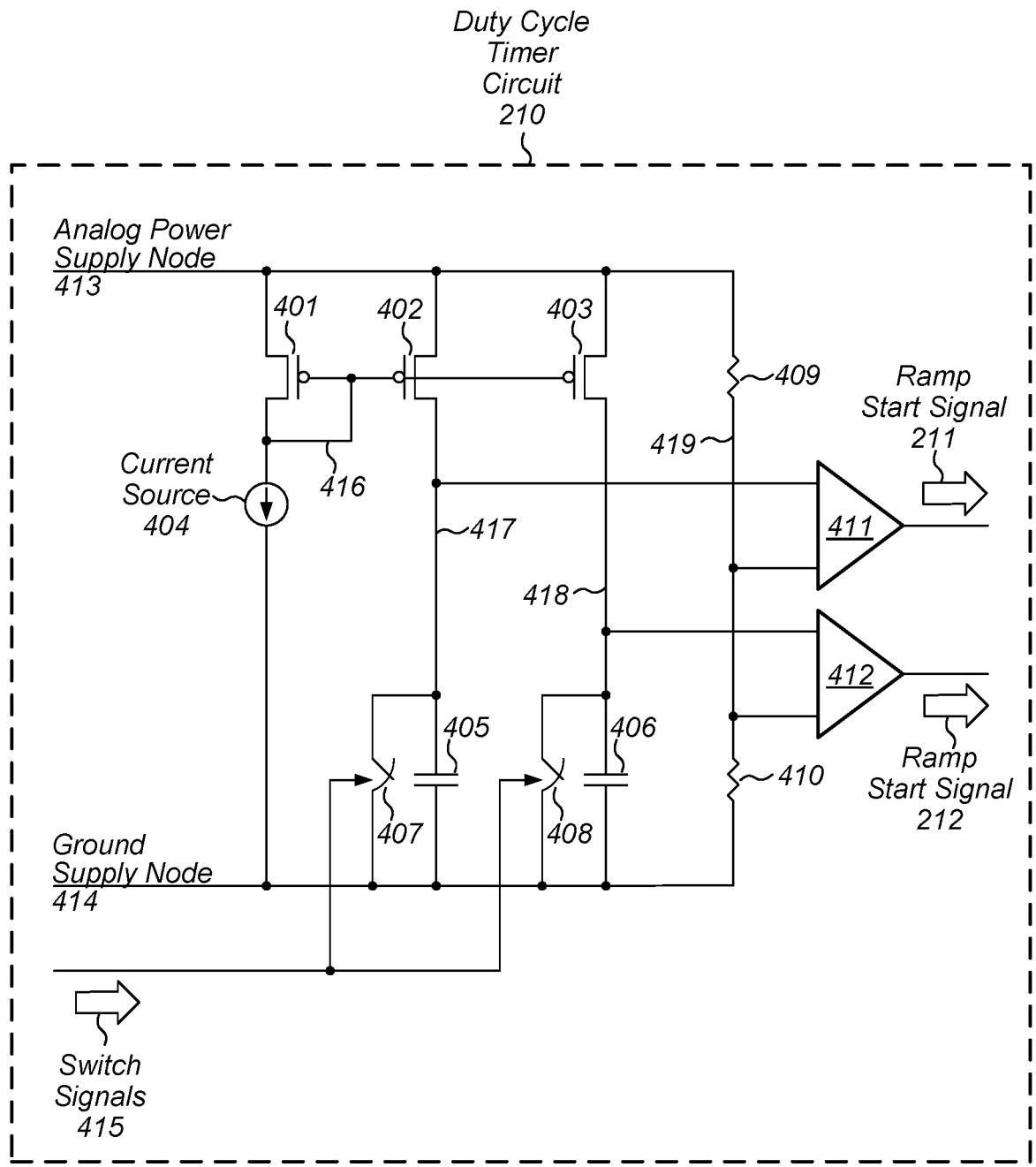
FIG. 4 is a block diagram of an embodiment of a duty cycle timer circuit.

Turning to FIG. 4, a block diagram of duty-cycle timer circuit 210 is depicted. As illustrated, duty-cycle timer circuit 210 includes devices 401-403, current source 404, comparator circuits 411 and 412, capacitors 405 and 406, switches 407 and 408, and resistors 409 and 410.

Current source 404 is coupled between node 416 and ground supply node 414, and is configured to sink a current from analog power supply node 413 through device 401. In various embodiments, current source 404 may be implemented using a resistor, a biased active device (e.g., a transistor), a portion of a current mirror circuit, or any other suitable circuit configured to sink a constant current. In some embodiments, the current sunk by current source 404 may be proportional to an input power supply. It is noted that analog power supply node 413 may be derived from the input power supply. In some cases, the voltage level of analog power supply node 413 may be different than the voltage level of the input power supply node.

Device 401 is coupled between analog power supply node 413 and node 416. Devices 402 and 403 are coupled between analog power supply node 413 and nodes 417 and 418, respectively. Devices 401-403 are controlled by a voltage level of node 416. In various embodiments, devices 401-403 form a current mirror circuit configured to generate currents in devices 402 and 403 based on a current in device 401. It is noted that differences in physical parameters (e.g., device width), can scale the currents in devices 402 and 403 up or down from the current in device 401. In various embodiments, devices 401-403 may be implemented as p-channel metal-oxide semiconductor field-effect transistors (MOSFETs), Fin field-effect transistors (FinFETs), gate-all-around field-effect transistors (GAAFETs), or other suitable transconductance devices.

Capacitor 405 is coupled between node 417 and ground supply node 414, and capacitor 406 is coupled between node 418 and ground supply node 414. A current in device 402 charges capacitor 405, increasing the voltage level of node 417. In a similar fashion, a current in device 403 charges capacitor 406, increasing the voltage level of node 418. Values of capacitors 405 and 406 may be selected based on a desired amount of delay from the start of a charge cycle before ramp start signal 211 and ramp start signal 212 are activated. In various embodiments, capacitors 405 and 406 may be implemented using a metal-oxide-metal (MOM) structure, a metal-insulator-metal (MIM) structure, or any other suitable structure available on a semiconductor manufacturing process.

Switch 407 is coupled between node 417 and ground supply node 414, while switch 408 is coupled between node 418 and ground supply node 414. Switch 407 is controlled by a particular one of switch signals 415, and switch 408 is controlled by a different one of switch signals 415. When switch 407 is closed, capacitor 405 is discharged into ground supply node 414, reducing the voltage level of node 417 to ground potential. In a similar fashion, when switch 408 is closed, capacitor 406 is discharged into ground supply node 414, reducing the voltage level of node 418 to ground potential. In various embodiments, capacitors 405 and 406 are discharged in order to reset duty-cycle timer circuit 210 for another on-time/off-time cycle.

Resistor 409 is coupled between analog power supply node 413 and node 419. In a similar fashion, resistor 410 is coupled between node 419 and ground supply node 414. Resistors 409 and 410 may, in some embodiments, form a resistive voltage divider circuit configured to generate a particular voltage level on node 419. Values of resistors 409 and 410 may be selected to determine respective trip points for comparator circuits 411 and 412 and, in conjunction with the values for capacitors 405 and 406, determine an amount of time before ramp start signal 211 and ramp start signal 212 are activated after the initiation of a charge cycle. In various embodiments, resistors 409 and 410 may be implemented using polysilicon, metal, or any other suitable material available on a semiconductor manufacturing process.

Comparator circuit 411 is configured to generate ramp start signal 211 using the voltage level of node 419 and the voltage level of node 417. To generate ramp start signal 211, comparator circuit 411 may be further configured to activate ramp start signal 211 in response to a determination that the voltage level of node 417 is greater than the voltage level of node 419.

Comparator circuit 412 is configured to generate ramp start signal 212 using the voltage level of node 419 and the voltage level of node 418. To generate ramp start signal 212, comparator circuit 412 may be further configured to activate ramp start signal 212 in response to a determination that the voltage level of node 418 is greater than the voltage level of node 419.

In various embodiments, comparator circuit 411 and comparator circuit 412 may be implemented as Schmitt Trigger circuits. Alternatively, comparator circuits 411 and 412 may be implemented as differential amplifier circuits, or any other suitable circuit configured to generate an output signal using the respective voltage levels of at least two input signals.

Figure 5:
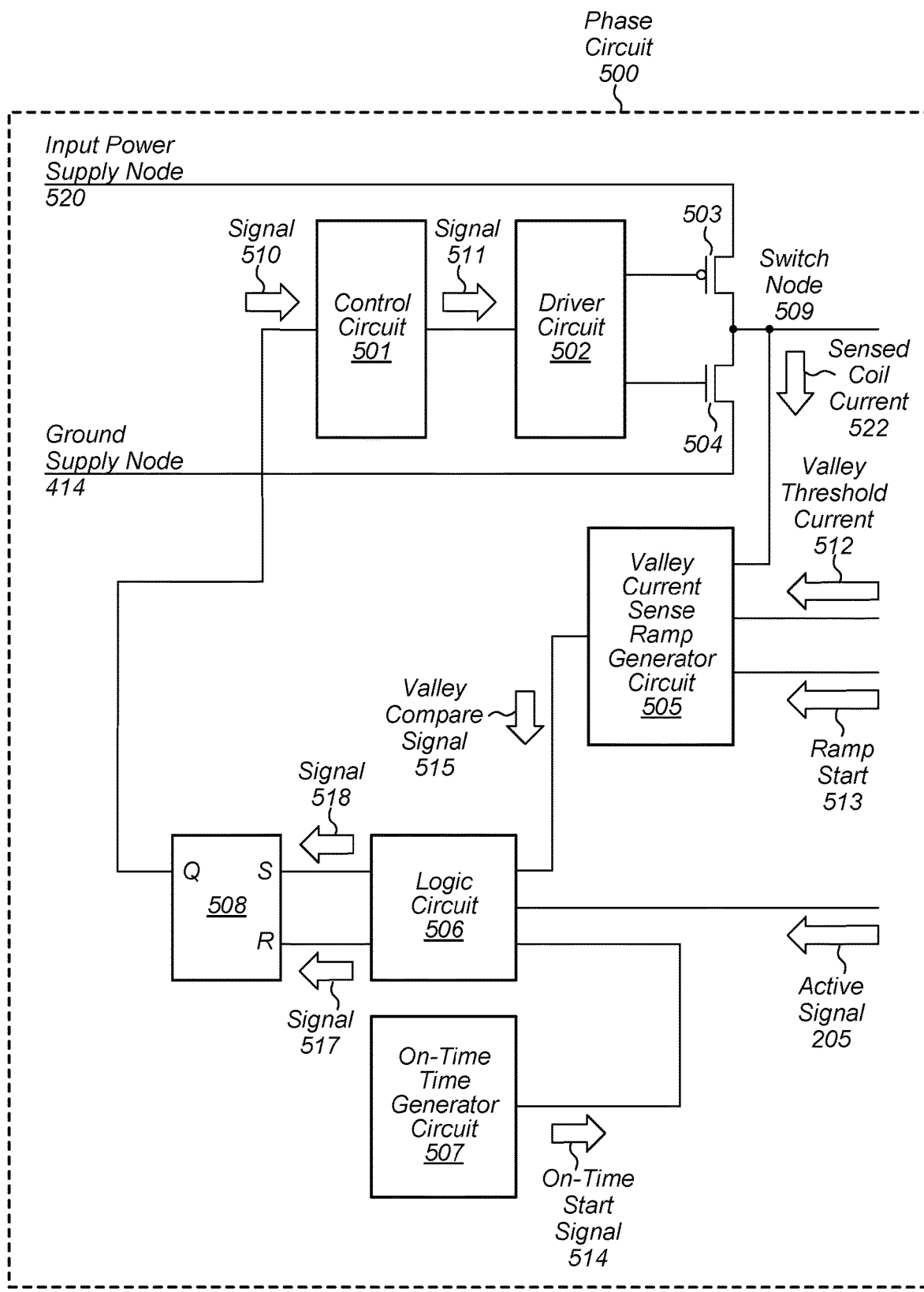
FIG. 5 is a block diagram of an embodiment of a valley-mode phase circuit.

Turning to FIG. 5, an embodiment of a phase circuit that employs valley control is depicted. As illustrated, phase circuit 500 includes control circuit 501, driver circuit 502, devices 503 and 504, valley-current sense ramp generator circuit 505, on-time generator circuit 507, logic circuit 506, and latch circuit 508. It is noted that phase circuit 500 may correspond to either of phase circuits 102 or 103 as depicted in FIG. 1.

Control circuit 501 is configured to generate signal 511 using signal 510. In various embodiments, control circuit 501 may be a microcontroller, state machine, or other sequential logic circuit configured to disable driver circuit 502 during the time period (referred to as a "dead time") between different active periods. During active periods, control circuit 501 is configured to generate signal 511 so as to activate and de-activate devices 503 and 504 based on whether phase circuit 500 is operating in an on-time period or an off-time period as indicated by signal 511.

Driver circuit 502 is configured to selectively activate device 503 and device 504 based on signal 511. In various embodiments, driver circuit 502 may activate device 503 and de-activate device 504 during an on-time period, and de-activate device 503 and activate device 504 during an off-time period. Driver circuit 502 may, in various embodiments, include multiple inverter circuits and other logic gates.

Device 503 is coupled between input power supply node 520 and switch node 509, and is configured to selectively couple switch node 509 to input power supply node 520 during an on-time period, allowing a current to flow from input power supply node 520 to switch node 509. It is noted that switch node 509 may be coupled to one of coils 106A or 106B. Device 504 is coupled between switch node 509 and ground supply node 414, and is configured to selectively couple switch node 509 during an off-time period allowing a current to recirculate from ground supply node 414 to switch node 509. In various embodiments, device 503 may be implemented as a p-channel MOSFET, FinFET, GAAFET, or other suitable transconductance device. Device 504 may be implemented as an n-channel MOSFET, FinFET, GAAFET, or other suitable transconductance device.

Valley-current sense ramp generator circuit 505 is configured to generate valley-compare signal 515. As described below, valley-current sense ramp generator circuit 505 may be configured to generate a ramp signal in response to an activation of ramp start 513, and to use the ramp signal along with a current sensed in switch node 509 (sensed coil current 522), and valley threshold current 512 to generate valley-compare signal 515. It is noted that at the same load current, setting a higher value for valley threshold current 512 can reduce the frequency of active periods rather than a lower value for valley threshold current 512. Higher values for valley threshold current 512 allow for the support of higher load currents, while lower values for valley threshold current 512 may result in less conduction loss.

Logic circuit 506 is configured to generate signals 517 and 518 using valley-compare signal 515, active signal 205 and on-time start signal 514. In some cases, logic circuit 506 is configured to activate signal 518 in response to an activation of active signal 205 and on-time start signal 514. Logic circuit 506 may be further configured to de-activate signal 518 and activate signal 517 in response to an activation of valley-compare signal 515. In various embodiments, logic circuit 506 may be implemented using a microcontroller, a state machine, or any other suitable sequential logic circuit.

On-time generator circuit 507 is configured to generate on-time start signal 514 using the voltage level of regulated power supply node 104 and the voltage level of input power supply node 520. In various embodiments, the timing of on-time start signal 514 is different for an initial on-time than for subsequent on-times. In some cases, different instances of on-time generator circuit 507 for different phase circuits may be configured to generate initial versions of on-time start signal 514 at different times to induce a phase shift between the different phase circuits.

Latch circuit 508 may be an embodiment of a set-reset latch (also referred to as a "SR latch") that is configured to activate signal 510 in response to activation of signal 518. Latch circuit 508 is also configured to de-activate signal 510 in response to an activation of signal 517 regardless of the activation state of signal 518.

Figure 6:
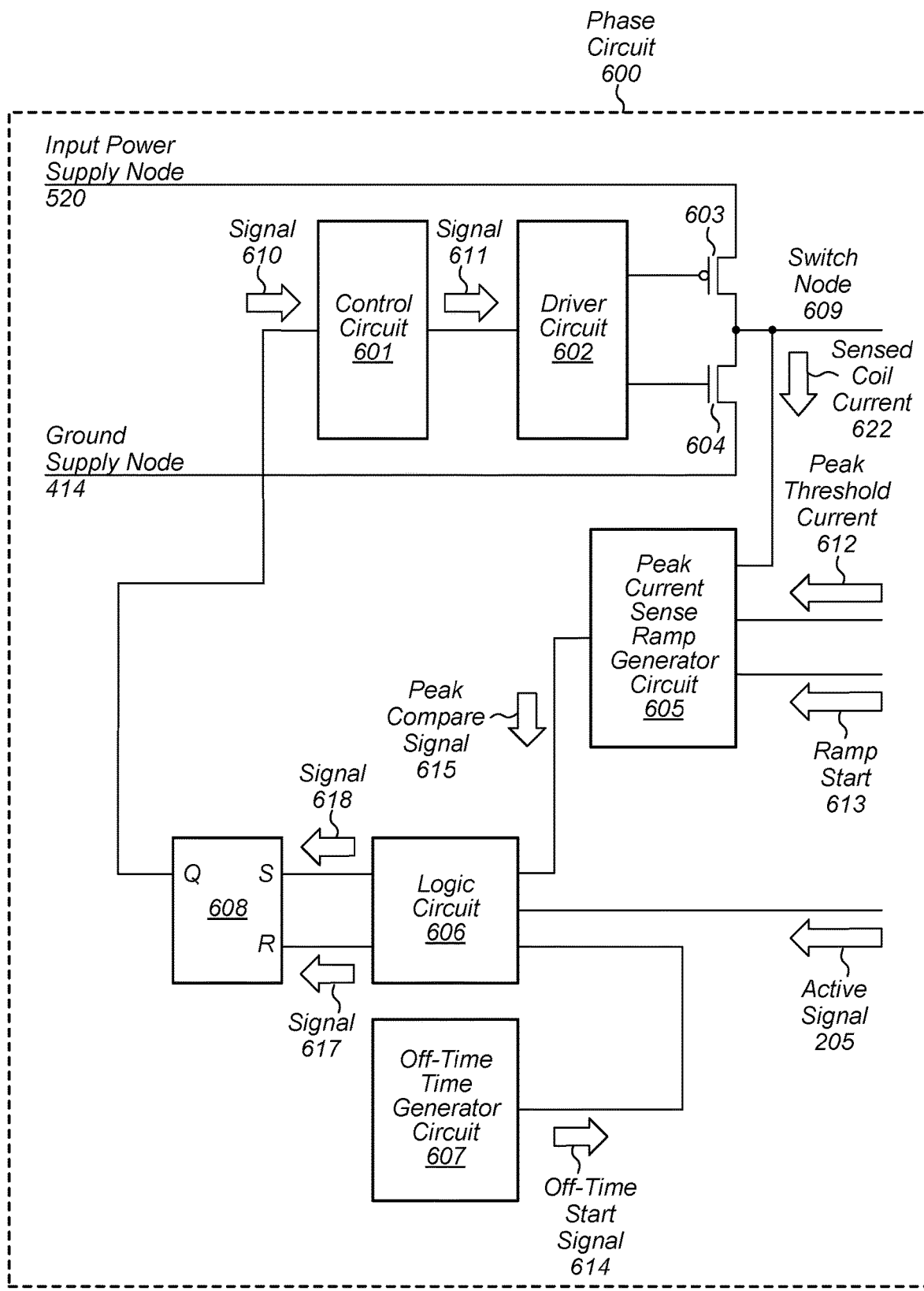
FIG. 6 is a block diagram of an embodiment of a peak-mode phase circuit.

Turning to FIG. 6, an embodiment of a phase circuit that employs off-time peak current control is depicted. As illustrated, phase circuit 600 includes control circuit 601, driver circuit 602, devices 603 and 604, peak-current sense ramp generator circuit 605, logic circuit 606, off-time generator circuit 607, and latch circuit 608. It is noted that phase circuit 600 may correspond to either of phase circuits 102 and 103 as depicted in FIG. 1.

Control circuit 601 is configured to generate signal 611 using signal 610. In various embodiments, control circuit 601 may be a microcontroller, state machine, or other sequential logic circuit configured to disable driver circuit 602 during the time period (referred to as a "dead time") between different active periods. During active periods, control circuit 601 is configured to generate signal 611 so as to activate and de-activate devices 603 and 604 based on whether phase circuit 600 is operating in an on-time period or an off-time period as indicated by signal 610.

Driver circuit 602 is configured to selectively activate device 603 and device 604 based on signal 611. In various embodiments, driver circuit 602 may activate device 603 and de-activate device 604 during an on-time period, and de-activate device 603 and activate device 604 during an off-time period. Driver circuit 602 may, in various embodiments, include multiple inverter circuits and other logic gates.

Device 603 is coupled between input power supply node 520 and switch node 609, and is configured to selectively couple switch node 609 to input power supply node 520 during an on-time period, allowing a current to flow from input power supply node 520 to switch node 609. It is noted that switch node 609 may be coupled to one of coils 106A or 106B. Device 604 is coupled between switch node 609 and ground supply node 414, and is configured to selectively couple switch node 609 to ground supply node 414 during an off-time period allowing a current to recirculate from ground supply node 414 to switch node 609. Device 603 may, in some embodiments, be implemented as a p-channel MOSFET, FinFET, GAAFET, or other suitable transconductance device. Device 604 may be implemented as an n-channel MOSFET, FinFET, GAAFET, or other suitable transconductance device.

Peak-current sense ramp generator circuit 605 is configured to generate peak-compare signal 615. As described below, peak-current sense ramp generator circuit 605 may be configured to generate a ramp signal in response to an activation of ramp start 613, and to use the ramp signal along with a current sensed in switch node 609 (sensed coil current 622) and peak threshold current 612 to generate peak-compare signal 615. It is noted that at the same load current, setting a lower value for peak threshold current 612 can increase the frequency of active periods rather than a higher value for peak threshold current 612.

Logic circuit 606 is configured to generate signals 617 and 618 using peak-compare signal 615, active signal 205 and off-time start signal 614. In some cases, logic circuit 606 is configured to activate signal 618 in response to an activation of active signal 205 and off-time start signal 614. Logic circuit 606 may be further configured to de-activate signal 618 and activate signal 617 in response to an activation of peak-compare signal 615. In various embodiments, logic circuit 606 may be implemented using a microcontroller, a state machine, or any other suitable sequential logic circuit.

Off-time generator circuit 607 is configured to generate off-time start signal 614 using the voltage level of regulated power supply node 104 and the voltage level of input power supply node 520. In various embodiments, the timing of off-time start signal 614 is different for an initial off-time than for subsequent off-times. In some cases, different instances of off-time generator circuit 607 for different phase circuits, may be configured to generate initial versions of off-time start signal 614 at different times to induce a phase shift between the different phase circuits.

Latch circuit 608 may be an embodiment of a set-reset latch (also referred to as a "SR latch") that is configured to activate signal 610 in response to activation of signal 618. Latch circuit 608 is also configured to de-activate signal 610 in response to an activation of signal 617 regardless of the activation state of signal 618.

Figure 7:
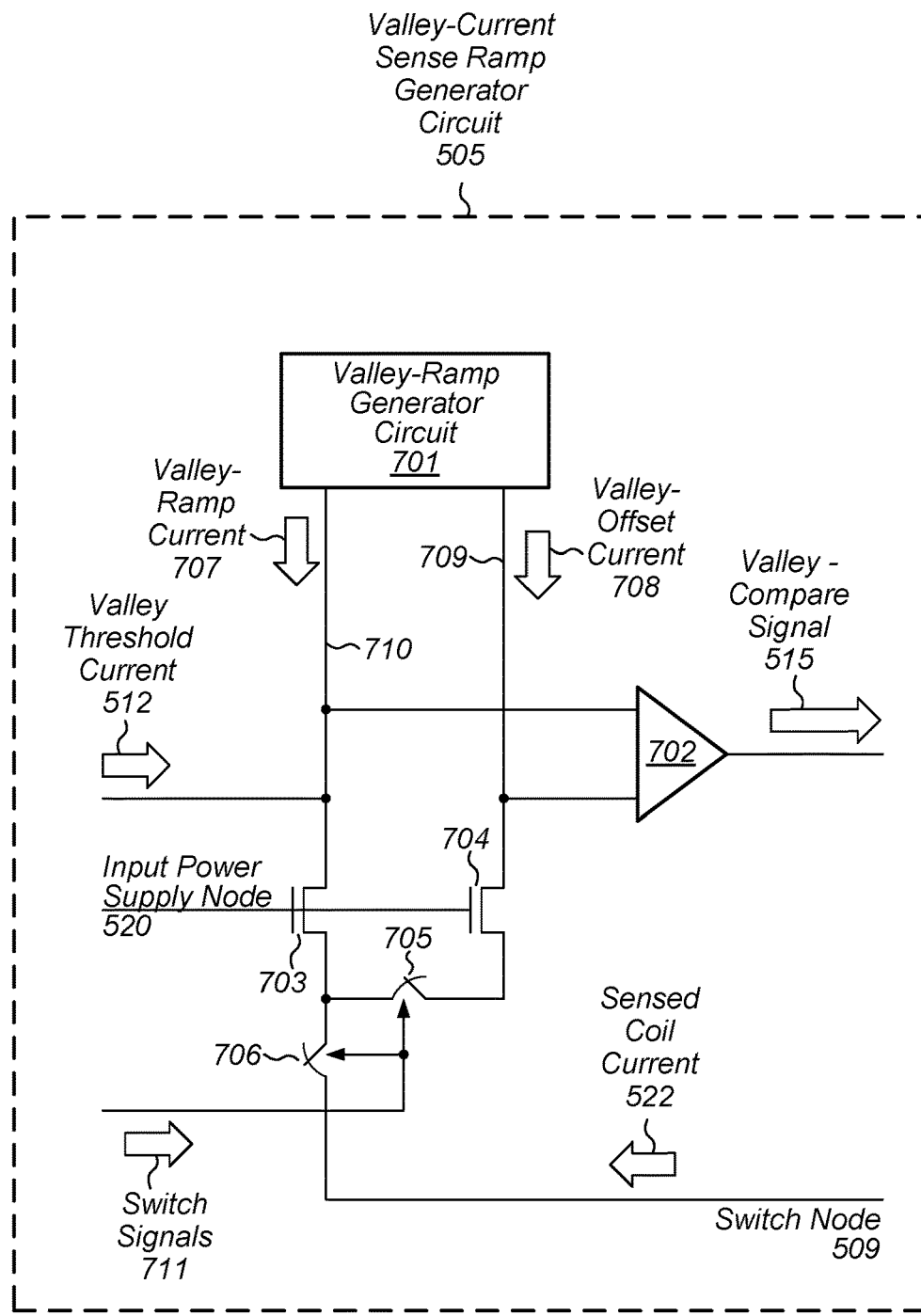
FIG. 7 is a block diagram of an embodiment of a valley current sense circuit.

Turning to FIG. 7, a block diagram of an embodiment of valley-current sense ramp generator circuit 505 is depicted. As illustrated, valley-current sense ramp generator circuit 505 includes valley-ramp generator circuit 701, comparator circuit 702, devices 703 and 704, and switches 705 and 706.

Valley-ramp generator circuit 701 is configured to generate valley-ramp current 707, and valley-offset current 708. As described below, valley-ramp generator circuit 701 may be configured to generate valley-ramp current 707 and valley-offset current 708 using analog power supply node 413.

Comparator circuit 702 is configured to generate valley-compare signal 515 using the respective voltage levels of nodes 709 and 710. In various embodiments, comparator circuit 702 may be configured to activate valley-compare signal 515, in response to a determination that the inductor current (either inductor current 107A or 107B flowing in switch node 509) is within a threshold value of the sum of valley-ramp current 707 and valley threshold current 512, less valley-offset current 708. Comparator circuit 702 may, in various embodiments, be implemented as a Schmitt trigger circuit, or any other suitable circuit configured to activate and de-activate a digital signal based on a comparison of two or more analog signals.

Device 703 is coupled between node 710 and switches 705 and 706, and is controlled by a voltage level of input power supply node 520. In a similar fashion, device 704 is coupled between node 709 and switch 705, and is controlled by the voltage level of input power supply node 520. In various embodiments, devices 703 and 704 function as sense resistors, generating respective voltages on nodes 710 and 709 using the currents flowing in those nodes. Devices 703 and 704 may, in various embodiments, be implemented as n-channel MOSFETs, FinFETS, GAAFETs, or other suitable transconductance devices.

Switch 706 is coupled between switch node 509 and the combination of devices 703 and switch 705. In various embodiments, switch 706 is configured to couple switch node 509 to device 703 (and switch 705), in response to an activation of a particular one of switch signals 711. In some cases, the activation of the particular one of switch signals 711 may correspond to an activation of device 504 in phase circuit 500. Switch 705 is coupled between device 704 and the combination of device 703 and switch 706. In various embodiments, switch 705 is configured to couple device 704 to device 703, in response to an activation of a different one of switch signals 711. The activation of the different one of switch signals 711 may, in some embodiments, correspond to a de-activation of device 504 of phase circuit 500.

In various embodiments, switches 705 and 706 may be implemented using one or more MOSFETs, FinFETs, GAAFETs, or other suitable switching devices. For example, in some embodiments, switches 705 and 706 may be implemented as pass gate circuits that include at least one n-channel MOSFET and one p-channel MOSFET.

Figure 8:
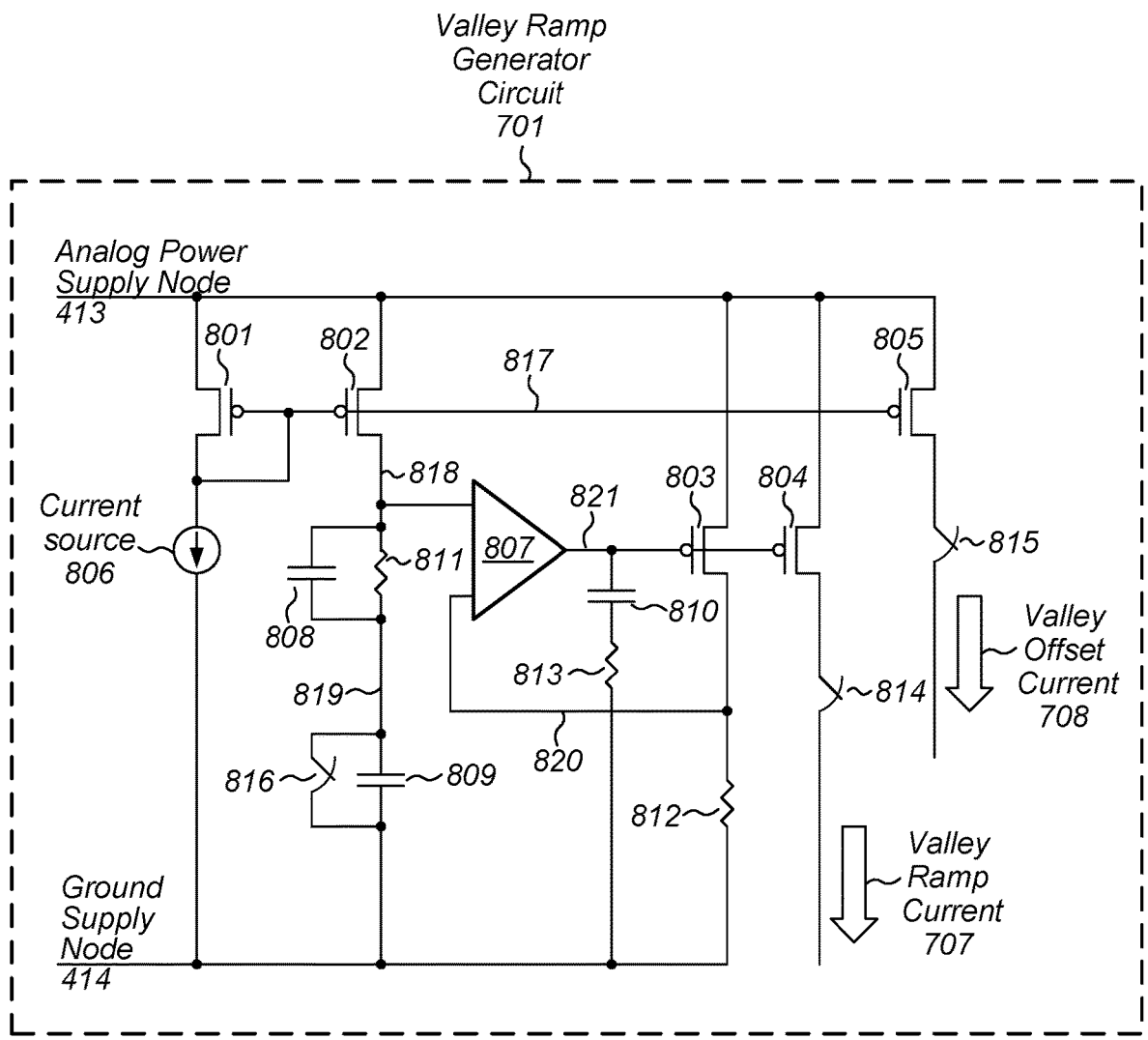
FIG. 8 is a block diagram of an embodiment of a valley ramp generator circuit.

Turning to FIG. 8, a block diagram of an embodiment of valley-ramp generator circuit 701 is depicted. As illustrated, valley-ramp generator circuit 701 includes devices 801-805, current source 806, comparator circuit 807, capacitors 808-810, resistors 811-813, and switches 814-816.

Device 801 is coupled between analog power supply node 413 and node 817, and is controlled by a voltage level of node 817. Device 802 is coupled between analog power supply node 413 and node 818, and is controlled by the voltage level of node 817. In various embodiments, devices 801 and 802 form a current mirror circuit configured to replicate a current flowing in device 801 into a current flowing in device 802. Device 805 is coupled between analog power supply node 413 and switch 815, and is controlled by the voltage level of node 817. In various embodiments, device 805 may be included in the current mirror circuit, and may be configured to replicate the current flowing in device 801. Devices 801, 802 and 805 may, in various embodiments, be implemented as p-channel MOSFETs, FinFETs, GAAFETs, or any other suitable transconductance device.

Device 805 is coupled between analog power supply node 413 and switch 815. In various embodiments, device 805 is configured to generate valley-offset current 708 based on a voltage of node 817. As described above, device 805 may be configured to replicate a current flowing in device 801. Switch 815 may, in some embodiments, be opened to decouple device 805 from portions of valley-current sense ramp generator circuit 505 to prevent valley-offset current 708 from flowing into those portions of valley-current sense ramp generator circuit 505.

Current source 806 is coupled between node 817 and ground supply node 414. In some embodiments, current source 806 is configured to sink a current from node 817, which forces a current to flow in device 801. In various embodiments, current source 806 may be implemented as part of a current mirror circuit or any other suitable circuit configured to provide a constant current.

Resistor 811 and capacitor 808 are coupled between nodes 818 and 819. Capacitor 809 and switch 816 is coupled between node 819 and ground supply node 414. Current that flows through device 802 flows into resistor 811 and charges capacitor 809, generating a linearly increasing ramp voltage on node 818. The slope of the ramp voltage is based on a ratio of the values of capacitor 808, and capacitor 809, while the starting voltage of the ramp voltage is determined based on resistor 811. In various embodiments, switch 816 can be closed to discharge capacitor 809 and discharging nodes 818 and 819 to ground potential, readying the circuit for a subsequent cycle.

Comparator circuit 807 is configured to generate a voltage on node 821 based on the respective voltage levels of node 818 and 820. Capacitor 810 is coupled to resistor 813, which is, in turn, coupled to ground supply node 414. Device 803 is coupled between analog power supply node 413 and node 820. Resistor 812 is coupled between node 820 and ground supply node 414. Device 803 may, in various embodiments, be implemented as a p-channel MOSFET, FinFET, GAAFET, or any other suitable transconductance device.

In various embodiments, comparator circuit 807, in conjunction with device 803 is configured to function as a voltage-to-current converter circuit that converts the ramp voltage on node 818 to a ramp current flowing in device 804. In various embodiments, comparator circuit 807 may be implemented as a differential amplifier circuit, or any other suitable circuit configured to generate an output signal based on at least two input signals.

Device 804 is coupled between analog power supply node 413 and switch 814. In various embodiments, device 804 is configured to generate valley-ramp current 707 based on a voltage level of node 821. Device 804 may, in various embodiments, be implemented as a p-channel MOSFET, FinFET, GAAFET, or any other suitable transconductance device. Switch 814 may, in some embodiments, be opened to decouple device 804 from portions of valley-current sense ramp generator circuit 505 to prevent valley-ramp current 707 from flowing into those portions of valley-current sense ramp generator circuit 505.

Resistors 811, 812, and 813 may be implemented using metal, polysilicon, or any other suitable material available on a semiconductor manufacturing process. Capacitors 808, 809, and 810 may be implemented using metal-oxide-metal (MOM) structures, metal-insulator-metal (MIM) structures, or any other suitable capacitor structure available on a semiconductor manufacturing process. Switches 814-816 may, in various embodiments, be implemented using one or more switching devices such as MOSFET, FinFET, GAAFETs, or any other suitable switching devices.

Figure 9:
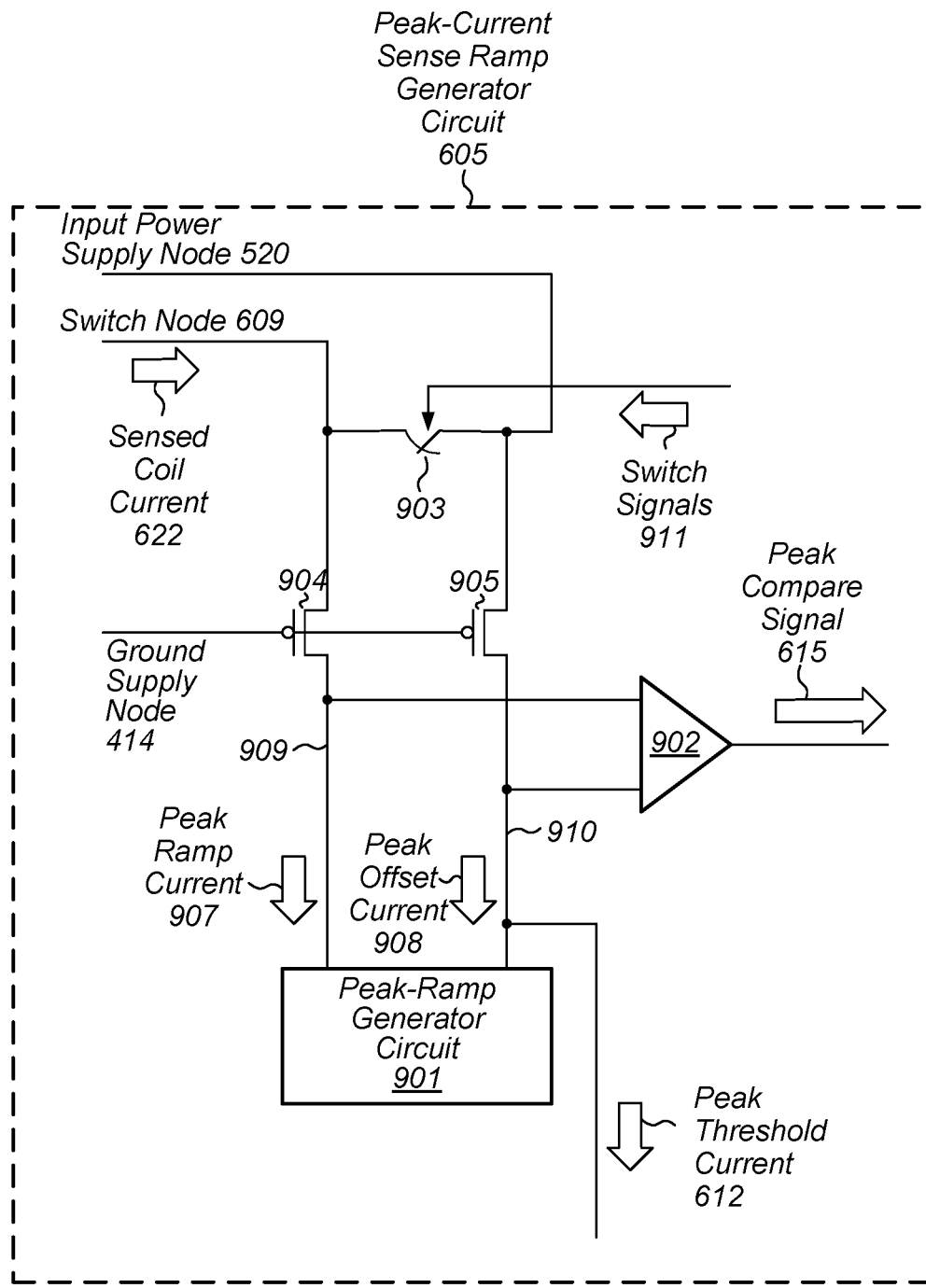
FIG. 9 is a block diagram of an embodiment of a peak current sense circuit.

As mentioned earlier, the use of ramp currents is not limited to valley-mode regulation. A block diagram of an embodiment of peak-current sense ramp generator circuit 605 is depicted in FIG. 9. As illustrated, peak-current sense ramp generator circuit 605 includes peak-ramp generator circuit 901, comparator circuit 902, switch 903, and devices 904 and 905.

Peak-ramp generator circuit 901 is configured to generate peak-ramp current 907, and peak-offset current 908. As described below, peak-ramp generator circuit 901 may be configured to generate peak-ramp current 907 and peak-offset current 908 using a peak ramp generator circuit that employs a voltage generated from analog power supply node 413. In various embodiments, peak-ramp generator circuit 901 is configured to sink peak ramp current 907 from node 909 and sink peak offset current 908 from node 910.

Comparator circuit 902 is configured to generate peak-compare signal 615 using the respective voltage levels of nodes 909 and 910. In various embodiments, the voltage level of node 909 is based on a combination of a voltage level of switch node 609 and peak ramp current 907. In a similar fashion, the voltage level of node 910 is based on a combination of the voltage level of input power supply node 520, peak offset current 908, and peak threshold current 612. Comparator circuit 902 may, in various embodiments, be implemented as a Schmitt trigger circuit, or any other suitable circuit configured to activate and de-activate a digital signal based on a comparison of two or more analog signals.

Device 904 is coupled between node 909 and switch node 609, and is controlled by the voltage level of ground supply node 414. In a similar fashion, device 905 is coupled between node 910 and input power supply node 520, and is controlled by the voltage level of ground supply node 414. In various embodiments, devices 904 and 905 function as sense resistors, generating respective voltages on nodes 910 and 909 using the currents flowing in those nodes. Devices 904 and 905 may, in various embodiments, be implemented as p-channel MOSFETs, FinFETS, GAAFETs, or other suitable transconductance devices.

Switch 903 is coupled between switch node 609 and input power supply node 520, and is controlled by switch signals 911. In various embodiments, switch 903 is configured to couple switch node 609 to input power supply node 520, in response to an activation of one or more of switch signals 911. In some cases, the activation of the particular one of switch signals 911 may correspond to an activation of device 603 in phase circuit 600.

In various embodiments, switch 903 may be implemented using one or more MOSFETs, FinFETs, GAAFETs, or other suitable switching devices. For example, in some embodiments, switche 903 may be implemented as pass gate circuits that include at least one n-channel MOSFET and one p-channel MOSFET.

Figure 10:
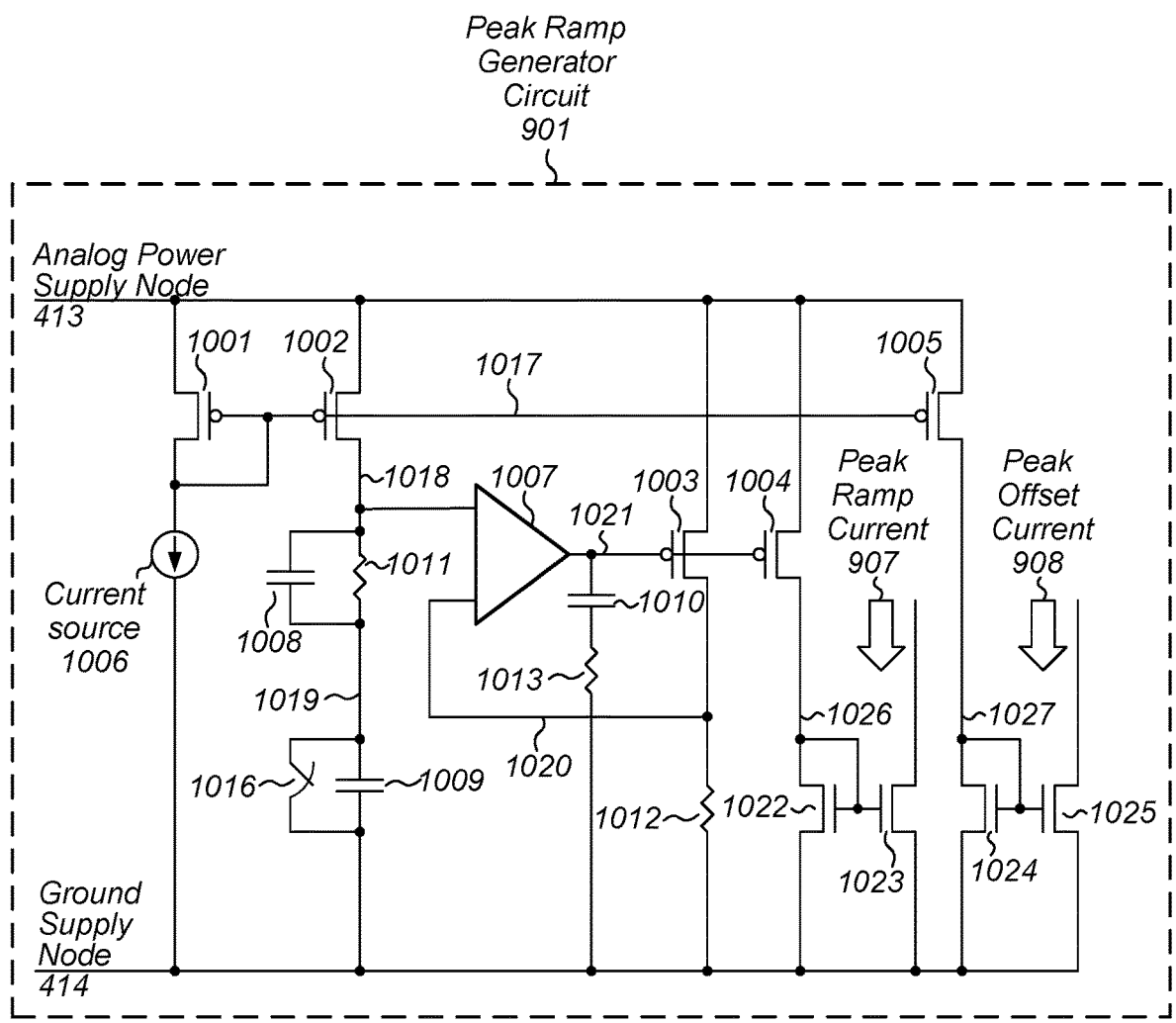
FIG. 10 is a block diagram of an embodiment of a peak ramp generator circuit.

Turning to FIG. 10, a block diagram of an embodiment of peak-ramp generator circuit 901 is depicted. As illustrated, peak-ramp generator circuit 901 includes devices 1001-1005, current source 1006, comparator circuit 1007, capacitors 1008-1010, resistors 1011-1013, switch 1016, and devices 1022-1025.

Device 1001 is coupled between analog power supply node 413 and node 1017, and is controlled by a voltage level of node 1017. Device 1002 is coupled between analog power supply node 413 and node 1018, and is controlled by the voltage level of node 1017. In various embodiments, devices 1001 and 1002 form a current mirror circuit configured to replicate a current flowing in device 1001 into a current flowing in device 1002. Device 1005 is coupled between analog power supply node 413 and switch 1015, and is controlled by the voltage level of node 1017. In various embodiments, device 1005 may be included in the current mirror circuit, and may be configured to replicate the current flowing in device 1001. Devices 1001, 1002 and 1005 may, in various embodiments, be implemented as p-channel MOSFETs, FinFETs, GAAFETs, or any other suitable transconductance device.

Device 1005 is coupled between analog power supply node 413 and node 1017. In various embodiments, device 1005 is configured to generate a current that flows into device 1024 based on a voltage of node 1017. As described above, device 1005 may be configured to replicate a current flowing in device 1001.

Current source 1006 is coupled between node 1017 and ground supply node 414. In some embodiments, current source 1006 is configured to sink a current from node 1017, which forces a current to flow in device 1001. In various embodiments, current source 1006 may be implemented as part of a current mirror circuit or any other suitable circuit configured to provide a constant current.

Resistor 1011 and capacitor 1008 are coupled between nodes 1018 and 1019. Capacitor 1009 and switch 1016 is coupled between node 1019 and ground supply node 414. Current that flows through device 1002 flows into resistor 1011 and charges capacitor 1009 generating a linearly increasing ramp voltage on node 1018. The slope of the ramp voltage is based on a ratio of the values of capacitor 1008, and capacitor 1009, while the start level of the ramp voltage is determined using resistor 1011. In various embodiments, switch 1016 can be closed to discharge capacitor 1009, as well as nodes 1018 and 1019, to ground potential, readying the circuit for a subsequent cycle.

Comparator circuit 1007 is configured to generate a voltage on node 1021 based on the respective voltage levels of node 1018 and 1020. Capacitor 1010 is coupled to resistor 1013, which is, in turn, coupled to ground supply node 414. Device 1003 is coupled between analog power supply node 413 and node 1020. Resistor 1012 is coupled between node 1020 and ground supply node 414. Device 1003 may, in various embodiments, be implemented as a p-channel MOSFET, FinFET, GAAFET, or any other suitable transconductance device.

In various embodiments, comparator circuit 1007, in conjunction with device 1003 is configured to function as a voltage-to-current converter circuit that converts the ramp voltage on node 1018 to a ramp current flowing in device 1004. In various embodiments, comparator circuit 1007 may be implemented as a differential amplifier circuit, or any other suitable circuit configured to generate an output signal based on at least two input signals.

Device 1004 is coupled between analog power supply node 413 and device 1022. In various embodiments, device 1004 is configured to generate a current that flows into device 1022 based on a voltage level of node 1021. Device 1022 is coupled between device 1004 and ground supply node 414, and is controlled by the voltage level on node 1026. Device 1023 is also controlled by the voltage level on node 1026, and is coupled to ground supply node 414. In various embodiments, devices 1022 and 1023 form a current mirror circuit configured to replicate a current flowing through devices 1004 and 1022 to generate peak-ramp current 907 flowing in device 1023. Device 1004 may, in various embodiments, be implemented as a p-channel MOSFET, FinFET, GAAFET, or any other suitable transconductance device. Devices 1022 and 1023 may, in various embodiments, be implemented as n-channel MOSFETs, FinFETs, GAAFETs, or any other suitable transconductance device.

Device 1024 is coupled between node 1027 and ground supply node 414, and is controlled by the voltage level of node 1027. In a similar fashion, device 1025 is also coupled to ground supply node 414 and is controlled by the voltage level of node 1027. In various embodiments, devices 1024 and 1025 form a current mirror circuit configured to replicate the current flowing through devices 1005 and 1024 to generate peak-offset current 908.

Figure 11:
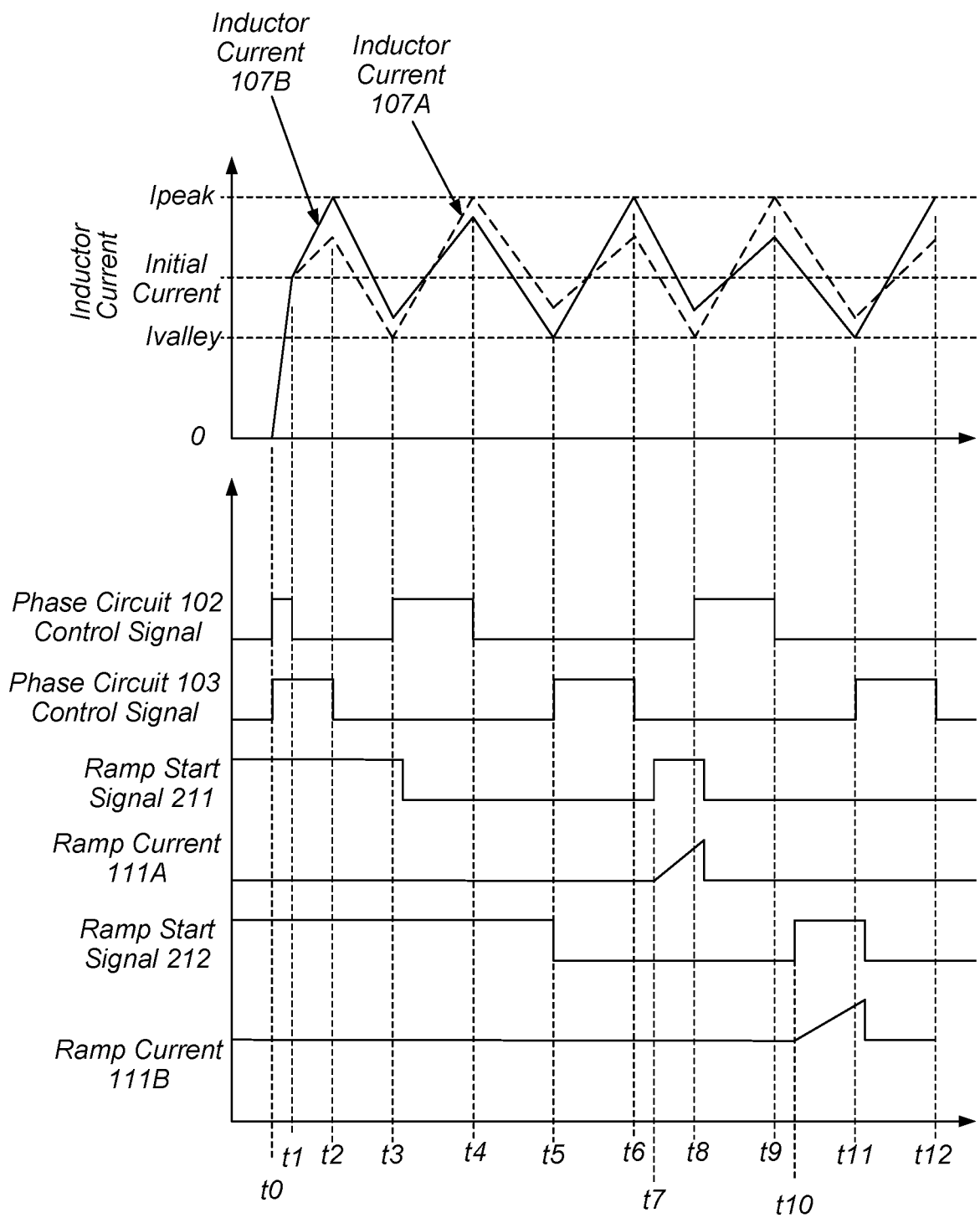
FIG. 11 depicts example waveforms associated with the operation of a power converter.

Turning to FIG. 11, example waveforms associated with the operation of a power converter circuit (e.g., power converter circuit 100) are illustrated. It is noted that the waveforms are an example of valley current regulation, and that different operating modes (e.g., peak current regulation), different component values, different duty cycles, and the like, may result in waveforms with a different appearance than those illustrated in FIG. 11.

At time t0, an active period is initiated. As described above, the active period may be initiated based on a comparison of the voltage level of regulated power supply node 104 and reference voltage 113. Once the active period has been initiated, both phase circuits 102 and 103 transition to a starting on-time period and begin supplying energy to their respective switch nodes, allowing inductor current 107A and inductor current 107B to begin to increase.

At time t1, the starting on-time elapses and phase circuit 102 control signal transitions from a high logic level to a low logic level, placing phase circuit 102 into an off-time, during which inductor current 107A begins to decrease. Also, at time t1, phase circuit 103 control signal remains at high logic level, keeping phase circuit 103 in an on-time, allowing inductor current 107B to increase.

At time t2, a half on-time period elapses and the phase circuit 103 control signal transitions to a low logic level. Phase circuit 103 transitions to an off-time period by opening its high side switch and closing its low side switch, causing inductor current 107B to decrease. Phase circuit 102 remains in an off-time period, and inductor current 107A continues to decrease.

At time t3, inductor current 107A reaches Ivalley, triggering a full on-time period for phase circuit 102. The phase circuit 102 control signal transitions from a low logic level to a high logic level, opening the low side switch of phase circuit 102 and closing the high side switch of phase circuit 102. During this time, phase circuit 103 remains in an off-time period. Also, at time t3, duty-cycle timer circuit 210 begins to track a time before activating ramp start signal 211. In various embodiments, duty-cycle timer circuit 210 is configured to track a time that is 80-percent of the cycle time of phase circuit 102.

At time t4, the full on-time period for phase circuit 102 elapses and the phase circuit 102 control signal transitions to a low logic level, placing phase circuit 102 in an off-time period, where inductor current 107A begins to decrease. Phase circuit 103 remains in an off-time period during this time.

At time t5, current 107B reaches Ivalley, triggering a full on-time period for phase circuit 103. The phase circuit 103 control signal transitions from a low logic level to a high logic level. Phase circuit 103 opens its low side switch and closes its high side switch, allowing current 107B to increase. Phase circuit 102 remains in an off-time period during this time. Also, at time t5, duty-cycle timer circuit 210 begins to track a time before activating ramp start signal 212.

At time t6, the full on-time period for phase circuit 103 elapses and the phase circuit 103 control signal transitions to a low logic level, placing phase circuit 103 in an off-time period, wherein current 107B begins to decrease. Phase circuit 102 remains in an off-time period during this time.

At time t7, duty-cycle timer circuit 210 activates ramp start signal 211 which, in turn, begins the generation of ramp current 111A. The value of ramp current 111A continues to increase until inductor current 107A reaches a value that is a combination of Ivalley and ramp current 111A.

At time t8, inductor current 107A reaches a value that is the combination of Ivalley and ramp current 111A, triggering a start of a full on-time period for phase circuit 102. The phase circuit 102 control signal transitions from a low-logic level to a high-logic level, opening the low side switch of phase circuit 102 and closing the high side switch of phase circuit 102. During this time, phase circuit 103 remains in an off-time period. Shortly after time t8, ramp start signal 211 and ramp current 111A transition to zero, in order to be ready for a subsequent cycle.

At time t9, the full on-time period for phase circuit 102 elapses and the phase circuit 102 control signal transitions to a low logic level, placing phase circuit 102 in an off-time period, where current 107A begins to decrease. Phase circuit 103 remains in an off-time period during this time.

At time t10, duty-cycle timer circuit 210 activates ramp start signal 212 which, in turn, begins the generation of ramp current 111B. The value of ramp current 111B continues to increase until inductor current 107B reaches a value that is a combination of Ivalley and ramp current 111B.

At time t11, inductor current 107B reaches a value that is a combination of Ivalley and ramp current 111B, triggering a full on-time period for phase circuit 103. The phase circuit 103 control signal transitions from a low-logic level to a high-logic level, opening the low-side switch of phase circuit 103 and closing the high-side switch of phase circuit 103. During this time, phase circuit 102 remains in an off-time period. Shortly after time t11, ramp start signal 212 and ramp current 111B transition to zero, in order to be ready for a subsequent cycle.

At time t12, the full on-time period for phase circuit 103 elapses, and the phase circuit 103 control signal transitions to a low-logic level, placing phase circuit 103 in an off-time period, wherein inductor current 107B begins to decrease. Phase circuit 102 remains in an off-time period during this time. The activation of phase circuits 102 and 103 may continue from time t12 as describe above, until active period 112 has ended.

Figure 12:
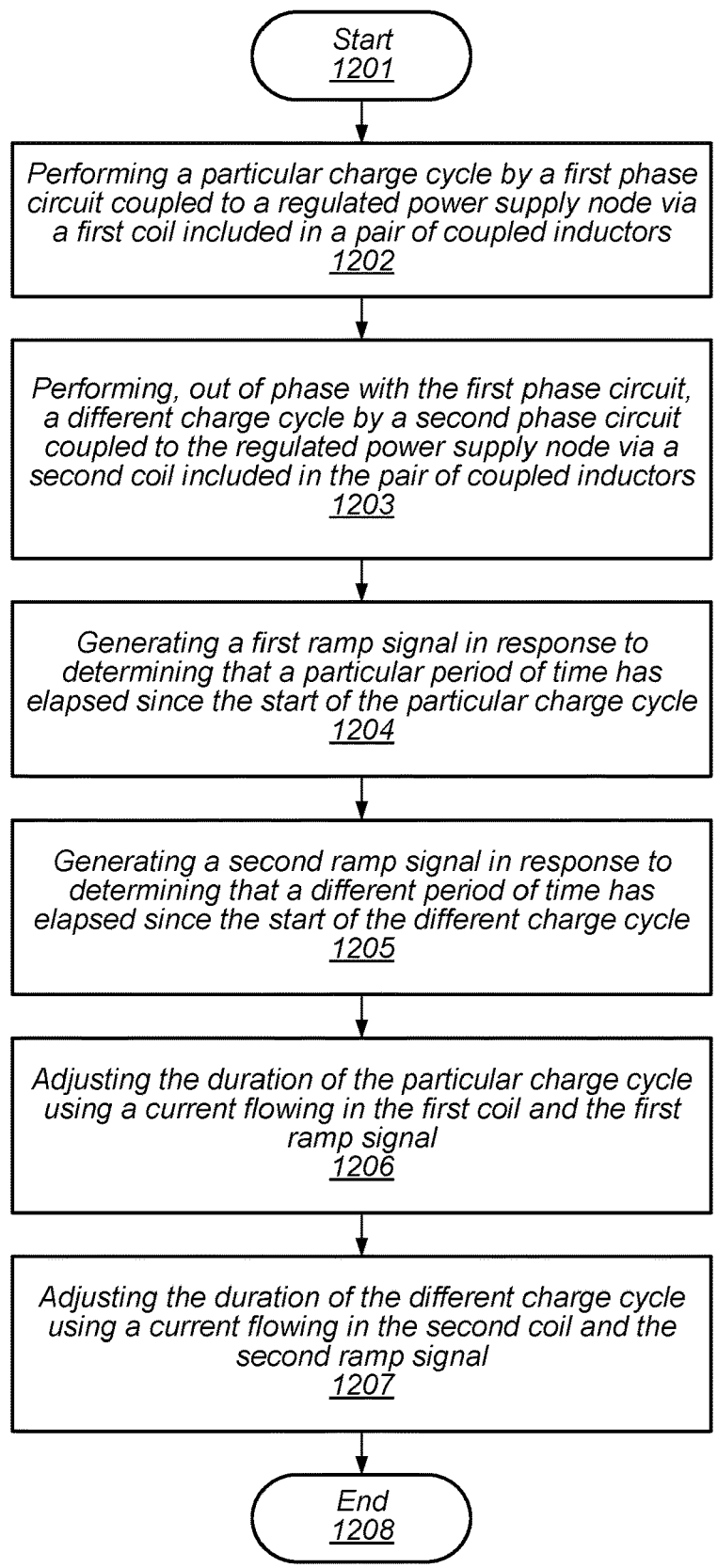
FIG. 12 depicts a flow diagram illustrating an embodiment of a method for operating a power converter circuit.

Turning to FIG. 12, a flow diagram depicting an embodiment of a method for operating a power converter circuit is illustrated. The method, which may be applied to power converter circuit 100, begins in block 1201.

The method includes performing a particular charge cycle by a first phase circuit coupled to a regulated power supply node via a first coil included in a pair of coupled inductors (block 1202).

The method also includes performing, out of phase with the first phase circuit, a different charge cycle by a second phase circuit coupled to the regulated power supply node via a second coil included in the pair of coupled inductors (block 1203).

In various embodiments, the method may further include initiating an active period of a power converter circuit that includes the first phase circuit and the second phase circuit. The method may also include performing the particular charge cycle in response to determining a first initial time has elapsed since an activation of the active period, and performing the different charge cycle in response to determining a second initial time has elapsed since the activation of the active period, where a duration of the second initial time is greater than the first initial time.

In some embodiments, the method may also include halting the active period in response to determining that respective numbers of charge cycles performed by the first phase circuit and the second phase circuit have completed.

The method further includes generating a first ramp signal in response to determining that a particular period of time has elapsed since the start of the particular charge cycle (block 1204). The method also includes generating a second ramp signal in response to determining that a different period of time has elapsed since the start of the different charge cycle (block 1205).

In various embodiments, the method also includes starting a first timer circuit in response to initiating the particular charge cycle, and starting a second timer circuit in response to initiating the different charge cycle. The method may further include initiating the first ramp current in response to a first value of the first timer circuit reaching a first threshold value, and initiating the second ramp current in response to a second value of the second timer circuit reaching a second threshold value.

The method further includes adjusting the duration of the particular charge cycle using a current flowing in the first coil and the first ramp signal (block 1206). In some embodiments, adjusting the duration of the particular charge cycle includes modifying a first off-time included in the particular charge cycle. Alternatively, adjusting the duration of the particular charge cycle includes modifying a first on-time included in the particular charge cycle.

The method also includes adjusting the duration of the different charge cycle using a current flowing in the second coil and the second ramp signal (block 1207). In some embodiments, adjusting the duration of the different charge cycle includes modifying a second off-time included in the different charge cycle. Alternatively, adjusting the duration of the different charge cycle includes modifying a second on-time included in the different charge cycle.

In some embodiments, adjusting the duration of the particular charge cycle includes comparing a first offset current to a first combination of the current flowing in the first coil, the first ramp signal, and a first threshold current. In various embodiments, adjusting the duration of the different charge cycle includes comparing a second offset current to a second combination of the current flowing in the second coil, the second ramp signal, and a second threshold current. The method concludes in block 1208.

Figure 13:
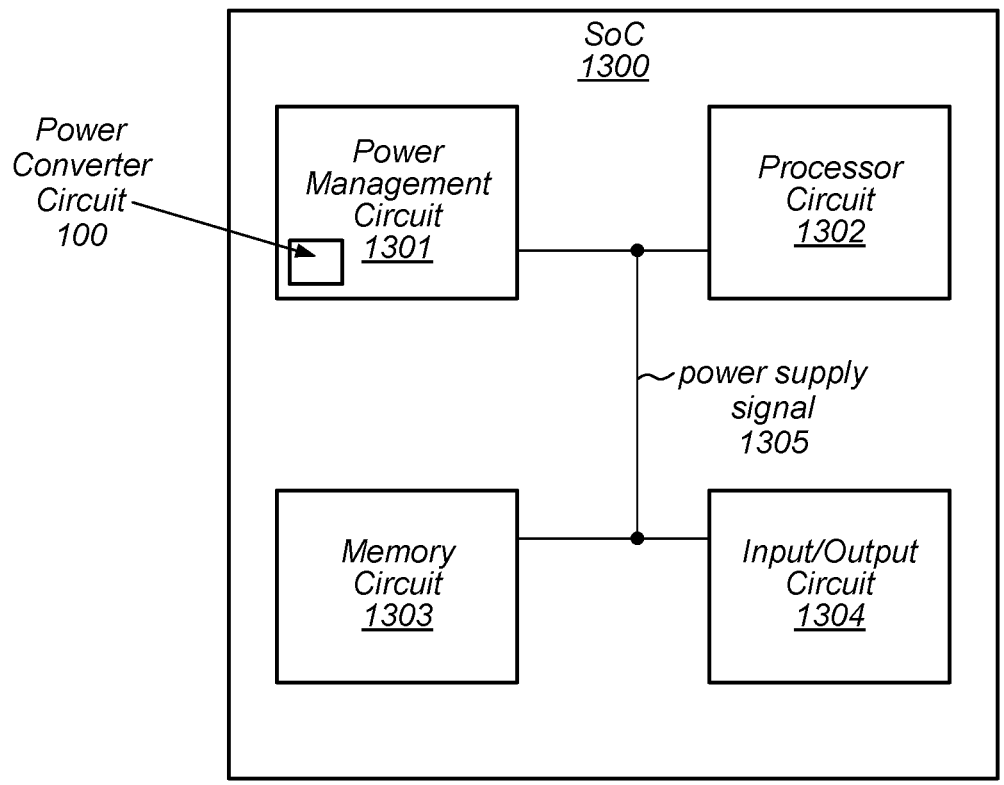
FIG. 13 illustrates a block diagram of a system-on-a-chip.

A block diagram of system-on-a-chip ("SoC") is illustrated in FIG. 13. In the illustrated embodiment, the SoC 1300 includes power management unit 1301, processor circuit 1302, memory circuit 1303, and input/output circuits 1304, each of which is coupled to power supply signal 1305. In various embodiments, SoC 1300 may be configured for use in a desktop computer, server, or in a mobile computing application such as, e.g., a tablet, laptop computer, or wearable computing device.

Power management unit 1301 includes power converter circuit 100 which is configured to generate a regulated voltage level on power supply signal 1305 in order to provide power to processor circuit 1302, memory circuit 1303, and input/output circuits 1304. Although power management unit 1301 is depicted as including a single power converter circuit, in other embodiments, any suitable number of power converter circuits may be included in power management unit 1301, each configured to generate a regulated voltage level on a respective one of multiple internal power supply signals included in SoC 1300. In cases where multiple power converter circuits are employed, two or more of the multiple power converter circuits may be connected to a common set of power terminals that connects to power supply signals and ground supply signals of SoC 1300.

Processor circuit 1302 may, in various embodiments, be representative of a general-purpose processor that performs computational operations. For example, processor circuit 1302 may be a central processing unit (CPU) such as a microprocessor, a microcontroller, an application-specific integrated circuit (ASIC), or a field-programmable gate array (FPGA).

Memory circuit 1303 may, in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 13, in other embodiments, any suitable number of memory circuits may be employed.

Input/output circuits 1304 may be configured to coordinate data transfer between SoC 1300 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1304 may be configured to implement a version of Universal Serial Bus (USB) protocol or IEEE 1394 (Firewire®) protocol.

Input/output circuits 1304 may also be configured to coordinate data transfer between SoC 1300 and one or more devices (e.g., other computing systems or integrated circuits) coupled to SoC 1300 via a network. In one embodiment, input/output circuits 1304 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1304 may be configured to implement multiple discrete network interface ports.

Figure 14:
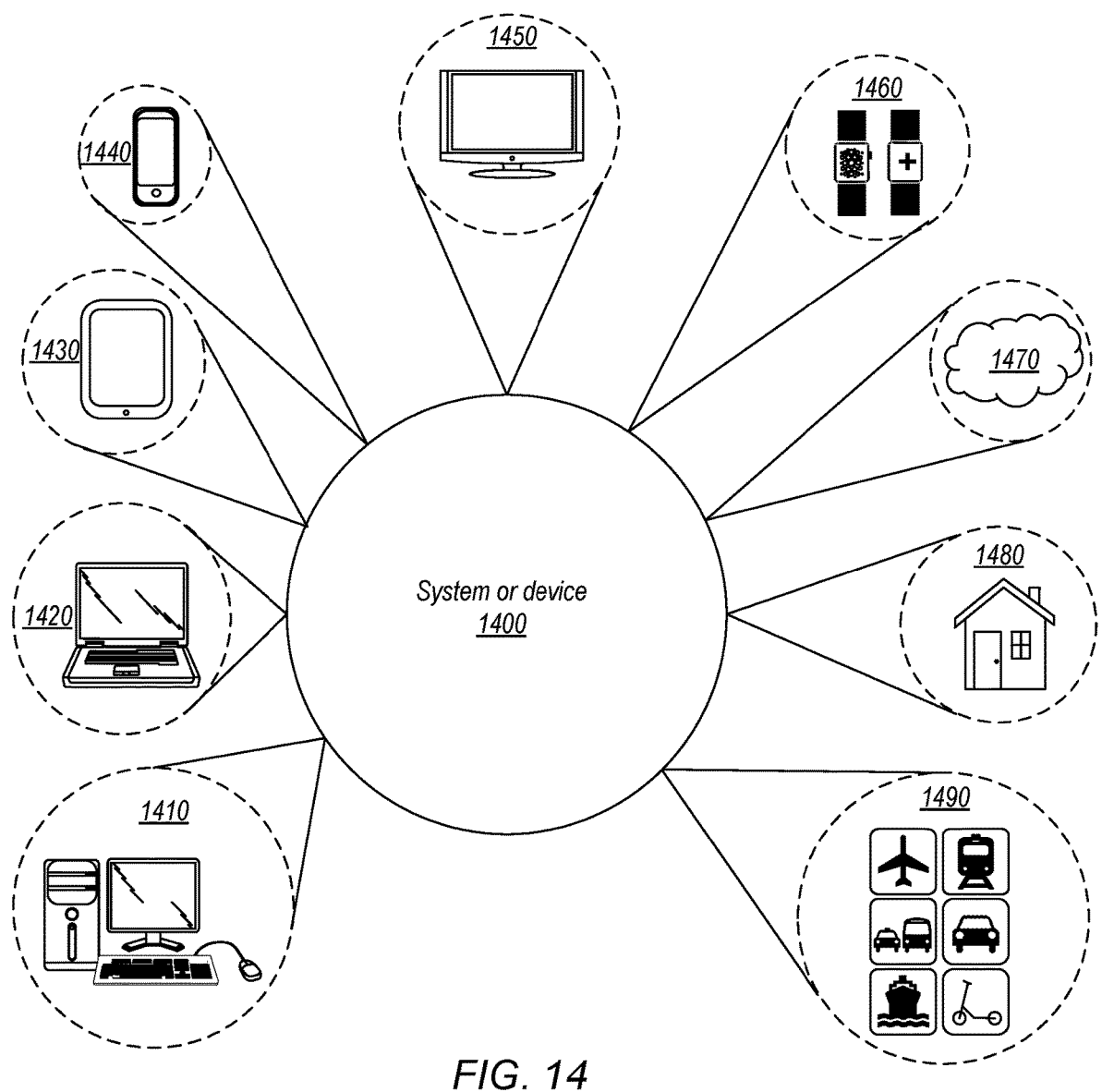
FIG. 14 is a block diagram of various embodiments of computer systems that may include power converter circuits.

Turning now to FIG. 14, various types of systems that may include any of the circuits, devices, or systems discussed above are illustrated. System or device 1400, which may incorporate or otherwise utilize one or more of the techniques described herein, may be utilized in a wide range of areas. For example, system or device 1400 may be utilized as part of the hardware of systems such as a desktop computer 1410, laptop computer 1420, tablet computer 1430, cellular or mobile phone 1440, or television 1450 (or set-top box coupled to a television).

Similarly, disclosed elements may be utilized in a wearable device 1460, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1400 may also be used in various other contexts. For example, system or device 1400 may be utilized in the context of a server computer system, such as a dedicated server or on shared hardware that implements a cloud-based service 1470. Still further, system or device 1400 may be implemented in a wide range of specialized everyday devices, including devices 1480 commonly found in the home such as refrigerators, thermostats, security cameras, etc. The interconnection of such devices is often referred to as the "Internet of Things" (IoT). Elements may also be implemented in various modes of transportation. For example, system or device 1400 could be employed in the control systems, guidance systems, entertainment systems, etc. of various types of vehicles 1490.

The applications illustrated in FIG. 14 are merely exemplary and are not intended to limit the potential future applications of disclosed systems or devices. Other example applications include, without limitation: portable gaming devices, music players, data storage devices, unmanned aerial vehicles, etc.

Figure 15:
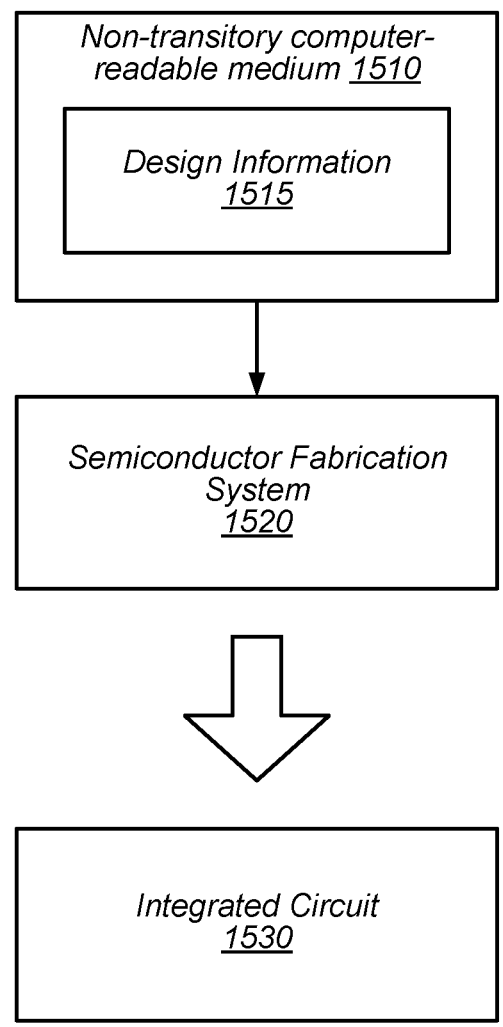
FIG. 15 illustrates an example of a non-transitory computer-readable storage medium that stores circuit design information.

FIG. 15 is a block diagram illustrating an example of a non-transitory computer-readable storage medium that stores circuit design information, according to some embodiments. In the illustrated embodiment, semiconductor fabrication system 1520 is configured to process the design information 1515 stored on non-transitory computer-readable storage medium 1510 and fabricate integrated circuit 1530 based on the design information 1515.

Non-transitory computer-readable storage medium 1510 may comprise any of various appropriate types of memory devices or storage devices. Non-transitory computer-readable storage medium 1510 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as Flash, magnetic media, e.g., a hard drive, or optical storage; registers, or other similar types of memory elements, etc. Non-transitory computer-readable storage medium 1510 may include other types of non-transitory memory as well or combinations thereof. Non-transitory computer-readable storage medium 1510 may include two or more memory mediums, which may reside in different locations, e.g., in different computer systems that are connected over a network.

Design information 1515 may be specified using any of various appropriate computer languages, including hardware description languages such as, without limitation: VHDL, Verilog, SystemC, SystemVerilog, RHDL, M, MyHDL, etc. Design information 1515 may be usable by semiconductor fabrication system 1520 to fabricate at least a portion of integrated circuit 1530. The format of design information 1515 may be recognized by at least one semiconductor fabrication system, such as semiconductor fabrication system 1520, for example. In some embodiments, design information 1515 may include a netlist that specifies elements of a cell library, as well as their connectivity. One or more cell libraries used during logic synthesis of circuits included in integrated circuit 1530 may also be included in design information 1515. Such cell libraries may include information indicative of device or transistor level netlists, mask design data, characterization data, and the like, of cells included in the cell library.

Integrated circuit 1530 may, in various embodiments, include one or more custom macrocells, such as memories, analog or mixed-signal circuits, and the like. In such cases, design information 1515 may include information related to included macrocells. Such information may include, without limitation, schematics capture database, mask design data, behavioral models, and device or transistor level netlists. As used herein, mask design data may be formatted according to graphic data system (GDSII) or any other suitable format.

Semiconductor fabrication system 1520 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1520 may also be configured to perform various testing of fabricated circuits for correct operation.

In various embodiments, integrated circuit 1530 is configured to operate according to a circuit design specified by design information 1515, which may include performing any of the functionality described herein. For example, integrated circuit 1530 may include any of various elements shown or described herein. Further, integrated circuit 1530 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation— [entity] configured to [perform one or more tasks] —is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to," An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
    a control circuit configured to initiate an active period for a first phase circuit and a second phase circuit;
    wherein the first phase circuit is coupled to a first switch node that is coupled to a regulated power supply node via a first coil of a pair of coupled inductors, wherein the first phase circuit is configured, in response to an initiation of the active period, to:
        cycle between a first set of on-time and off-time periods; and
        halt a particular off-time period of the first set based on a comparison of a first current flowing in the first coil, a first ramp current, and a first threshold current; and
    wherein the second phase circuit is coupled to a second switch node that is coupled to the regulated power supply node via a second coil of the pair of coupled inductors, and wherein the second phase circuit is configured, in response to the initiation of the active period, to:
        cycle, out of phase with the first phase circuit, between a second set of on-time and off-time periods; and
        halt a particular off-time period of the second set based on a comparison of a second current flowing in the second coil, a second ramp current, and a second threshold current.

2. The apparatus of claim 1, wherein the first phase circuit is further configured to cycle between the first set of on-time and off-time periods after a starting on-time period has elapsed since the initiation of the active period, and wherein the second phase circuit is further configured to cycle between the second set of on-time and off-time periods after the starting on-time period has elapsed, wherein a duration of an initial on-time period in the second set of on-time and off-time periods is less than a duration of a subsequent on-time period in the second set of on-time and off-time periods.

3. The apparatus of claim 1, wherein the first phase circuit includes a first timer circuit, wherein the second phase circuit includes a second timer circuit, and wherein the first phase circuit is further configured to:
    start the first timer circuit in response to an initiation of a particular on-time period that occurs prior to the particular off-time period; and
    initiate the first ramp current in response to a first value of the first timer circuit reaching a first threshold time; and
wherein the second phase circuit is further configured to:
    start the second timer circuit in response to the initiation of a given on-time period that occurs prior to the particular off-time period of the second set; and
    initiate the second ramp current in response to a second value of the second timer circuit reaching a second threshold time.

4. The apparatus of claim 1, wherein the first phase circuit is further configured to halt the first ramp current in response to a determination that the particular off-time period of the first set has ended, and wherein the second phase circuit is further configured to halt the second ramp current in response to a determination that the particular off-time period of the second set of on-time and off-time periods has ended.

5. The apparatus of claim 1, wherein the control circuit is further configured to halt the active period in response to a determination that respective numbers of the first set of on-time and off-time periods and the second set of on-time and off-time periods have completed.

6. The apparatus of claim 1, wherein to initiate the active period, the control circuit is further configured to:

perform a reference comparison of a voltage level of the regulated power supply node to a reference voltage level; and initiate the active period using a result of the reference comparison.

7. The apparatus of claim 1, wherein the first threshold current and the second threshold current are valley threshold currents.

8. A method, comprising:

cycling between a first set of on-time and off-time periods, by a first phase circuit coupled to a regulated power supply node via a first coil included in a pair of coupled inductors;

cycling, out of phase with the first phase circuit, between a second set of on-time and off-time periods, by a second phase circuit coupled to the regulated power supply node via a second coil included in the pair of coupled inductors;

halting, by the first phase circuit, a particular off-time period of the first set based on a comparison of a first current flowing in the first coil, a first ramp current, and a first threshold current; and halting, by the second phase circuit, a particular off-time period of the second set based on a comparison of a second current flowing in the second coil, a second ramp current, and a second threshold current.

9. The method of claim 8, further comprising:

initiating an active period of a power converter circuit that includes the first phase circuit and the second phase circuit; and determining that a starting on-time period has elapsed since initiation of the active period, before the cycling between the first set of on-time and off-time periods and the cycling between the second set of on-time and off-time periods.

10. The method of claim 9, further comprising halting the active period in response to determining that a particular number of on-time or off-time periods, in one or both of the first set or the second set, has completed.

11. The method of claim 9, wherein initiating the active period comprises:

performing a reference comparison of a voltage level of the regulated power supply node to a reference voltage level; and initiating the active period using a result of the reference comparison.

12. The method of claim 8, further comprising:

starting a first timer circuit in response to initiation of a particular on-time period that occurs prior to the particular off-time period of the first set;

initiating the first ramp current in response to a first value of the first timer circuit reaching a first threshold time;

starting a second timer circuit in response to initiation of a given on-time period that occurs prior to the particular off-time period of the second set; and initiating the second ramp current in response to a second value of the second timer circuit reaching a second threshold time.

13. The method of claim 12, further comprising:

halting, by the first phase circuit, the first ramp current in response to a determination that the particular off-time period of the first set has ended; and halting, by the second phase circuit, the second ramp current in response to a determination that the particular off-time period of the second set has ended.

14. The method of claim 8, wherein a duration of an initial on-time period in the second set of on-time and off-time periods is smaller than a duration of a subsequent on-time period in the second set of on-time and off-time periods.

15. An apparatus, comprising:

a functional circuit block coupled to a regulated power supply node; and a power converter circuit coupled to the regulated power supply node via coupled inductors, wherein the power converter circuit includes a first phase circuit coupled to the regulated power supply node via a first coil of the coupled inductors, and a second phase circuit coupled to the regulated power supply node via a second coil of the coupled inductors, and wherein the power converter circuit is configured to initiate an active period;

wherein, in response to an initiation of the active period, the first phase circuit is configured to:

cycle between a first set of on-time and off-time periods; and halt a particular off-time period of the first set based on a comparison of a first current flowing in the first coil, a first ramp current, and a first threshold current; and wherein, in response to an initiation of the active period, the second phase circuit is configured to:

cycle, out of phase with the first phase circuit, between a second set of on-time and off-time periods; and halt a particular off-time period of the second set based on a comparison of a second current flowing in the second coil, a second ramp current, and a second threshold current.

16. The apparatus of claim 15, wherein:

the first phase circuit is further configured to cycle between the first set of on-time and off-time periods after a starting on-time period has elapsed since the initiation of the active period;

the second phase circuit is further configured to cycle between the second set of on-time and off-time periods after the starting on-time period has elapsed; and a duration of an initial on-time period in the second set of on-time and off-time periods is less than a duration of a subsequent on-time period in the second set of on-time and off-time periods.

17. The apparatus of claim 15, wherein:

the first phase circuit includes a first timer circuit;

the second phase circuit includes a second timer circuit;

the first phase circuit is further configured to:

start the first timer circuit in response to an initiation of a particular on-time period that occurs prior to the particular off-time period; and initiate the first ramp current in response to a first value of the first timer circuit reaching a first threshold time; and the second phase circuit is further configured to:

start the second timer circuit in response to the initiation of a given on-time period that occurs prior to the particular off-time period of the second set; and initiate the second ramp current in response to a second value of the second timer circuit reaching a second threshold time.

18. The apparatus of claim 17, wherein:

the first phase circuit is further configured to halt the first ramp current in response to a determination that the particular off-time period of the first set has ended; and the second phase circuit is further configured to halt the second ramp current in response to a determination that the particular off-time period of the second set has ended.

19. The apparatus of claim 15, wherein the power converter circuit is further configured to halt the active period in response to a determination that a particular number of on-time or off-time periods, in one or both of the first set or the second set, has completed.

20. The apparatus of claim 15, wherein the power converter circuit is further configured to:
    perform a reference comparison of a voltage level of the regulated power supply node to a reference voltage level; and
    initiate the active period using a result of the reference comparison.

* * * * *